(12) United States Patent
Borras et al.

(10) Patent No.: US 12,168,621 B2
(45) Date of Patent: Dec. 17, 2024

(54) GALVANIC PROCESS FOR TREATING AQUEOUS COMPOSITIONS

(71) Applicant: NuQuatic, LLC, St. Paul, MN (US)

(72) Inventors: Carlos Borras, Ruskin, FL (US); Donald A. Luke, Valrico, FL (US)

(73) Assignee: NuQuatic, LLC, St. Paul, MN (US)

( * ) Notice: Subject to any disclaimer, the term of this patent is extended or adjusted under 35 U.S.C. 154(b) by 0 days.

(21) Appl. No.: 17/838,361

(22) Filed: Jun. 13, 2022

(65) Prior Publication Data

US 2022/0315457 A1 Oct. 6, 2022

Related U.S. Application Data

(63) Continuation of application No. 17/340,254, filed on Jun. 7, 2021, now Pat. No. 11,401,181.

(60) Provisional application No. 63/155,338, filed on Mar. 2, 2021.

(51) Int. Cl.
| | | |
|---|---|---|
| C02F 1/46 | (2023.01) | |
| C02F 1/00 | (2023.01) | |
| C02F 1/461 | (2023.01) | |
| C02F 1/463 | (2023.01) | |
| C02F 101/10 | (2006.01) | |
| C02F 101/30 | (2006.01) | |
| C02F 101/32 | (2006.01) | |
| C02F 103/30 | (2006.01) | |

(52) U.S. Cl.
CPC .......... *C02F 1/46176* (2013.01); *C02F 1/004* (2013.01); *C02F 1/46109* (2013.01); *C02F 1/463* (2013.01); *C02F 2001/46133* (2013.01); *C02F 2101/10* (2013.01); *C02F 2101/308* (2013.01); *C02F 2101/325* (2013.01); *C02F 2103/30* (2013.01)

(58) Field of Classification Search
None
See application file for complete search history.

(56) References Cited

U.S. PATENT DOCUMENTS

| | | |
|---|---|---|
| 1,018,355 A | 2/1912 | Galbreath |
| 2,449,706 A | 9/1948 | Jones |
| 3,385,785 A | 5/1968 | Forrest et al. |

(Continued)

FOREIGN PATENT DOCUMENTS

| | | |
|---|---|---|
| AU | 2020291450 B2 | 2/2023 |
| CA | 2953591 | 7/2018 |

(Continued)

OTHER PUBLICATIONS

"Japanese Application Serial No. 2021-573824, Final Notification of Reasons for Refusal mailed Apr. 4, 2023", w English Translation, 10 pgs.

(Continued)

*Primary Examiner* — Peter Keyworth
(74) *Attorney, Agent, or Firm* — Schwegman Lundberg & Woessner, P.A.

(57) ABSTRACT

A method of treating an aqueous composition includes immersing a galvanic cell in the aqueous composition to form a treated aqueous composition. The galvanic cell includes an anode including Mg, Al, Fe, Zn, or a combination thereof. The galvanic cell includes a cathode having a different composition than the anode, the cathode including Cu, Ni, Fe, or a combination thereof.

14 Claims, 8 Drawing Sheets

(56) References Cited

U.S. PATENT DOCUMENTS

| | | | |
|---|---|---|---|
| 3,425,925 A | 2/1969 | Fleischman | |
| 3,660,162 A | 5/1972 | Eisenberg | |
| 3,766,045 A * | 10/1973 | Itakura | C25B 1/26 204/278 |
| 3,901,804 A | 8/1975 | Ohuchi et al. | |
| 4,011,151 A | 3/1977 | Ito et al. | |
| 4,179,347 A | 12/1979 | Krause et al. | |
| 4,388,195 A | 6/1983 | Von et al. | |
| 4,655,895 A | 4/1987 | Feofanov et al. | |
| 5,167,777 A | 12/1992 | Kaczur et al. | |
| 5,439,566 A | 8/1995 | Zucker | |
| 5,454,917 A * | 10/1995 | Mattison | C02F 1/4678 205/567 |
| 5,876,575 A | 3/1999 | Kump | |
| 5,976,383 A | 11/1999 | Guess et al. | |
| 6,149,797 A | 11/2000 | Carey et al. | |
| 6,180,014 B1 | 1/2001 | Salama | |
| 6,210,587 B1 | 4/2001 | Vion | |
| 6,893,567 B1 | 5/2005 | Vanotti et al. | |
| 7,118,665 B2 | 10/2006 | Kin et al. | |
| 7,582,198 B2 | 9/2009 | Wilkins et al. | |
| 7,704,353 B2 * | 4/2010 | Stadelmann | C02F 1/46109 204/263 |
| 7,815,779 B2 | 10/2010 | Flettner | |
| 7,858,598 B2 | 12/2010 | Yang et al. | |
| 8,147,695 B2 | 4/2012 | Banerjee et al. | |
| 8,673,129 B2 | 3/2014 | Gordon et al. | |
| 8,715,469 B2 | 5/2014 | Pancurák et al. | |
| 8,926,804 B2 | 1/2015 | Pancurák et al. | |
| 9,346,692 B2 | 5/2016 | Combs et al. | |
| 9,446,974 B2 | 9/2016 | Milner et al. | |
| 9,580,338 B2 | 2/2017 | Fujikane et al. | |
| 9,593,030 B2 | 3/2017 | Fujikane et al. | |
| 9,637,403 B2 | 5/2017 | Mckay et al. | |
| 9,865,860 B2 | 1/2018 | Fauland | |
| 10,003,095 B2 | 6/2018 | Kovacs et al. | |
| 10,230,119 B2 | 3/2019 | Kovacs et al. | |
| 10,266,428 B1 | 4/2019 | Brian | |
| 10,343,937 B2 | 7/2019 | Casbeer et al. | |
| 10,427,195 B2 | 10/2019 | Ball | |
| 10,513,786 B2 | 12/2019 | Beddoes et al. | |
| 10,519,052 B2 | 12/2019 | Ball et al. | |
| 10,538,436 B2 | 1/2020 | Hu et al. | |
| 10,611,651 B2 | 4/2020 | Martikainen et al. | |
| 10,665,846 B2 | 5/2020 | Fauland | |
| 10,676,378 B2 | 6/2020 | Tandukar et al. | |
| 10,700,392 B2 | 6/2020 | Pantel et al. | |
| 10,752,521 B2 | 8/2020 | Nelson | |
| 10,800,678 B2 | 10/2020 | Gifford et al. | |
| 10,808,327 B2 | 10/2020 | Griffis et al. | |
| 10,865,128 B2 | 12/2020 | Ball | |
| 10,882,766 B2 | 1/2021 | Taylor | |
| 10,954,144 B2 | 3/2021 | Ball et al. | |
| 11,136,248 B2 | 10/2021 | Pettersson et al. | |
| 11,148,964 B2 | 10/2021 | Ball | |
| 11,220,443 B2 | 1/2022 | Borras et al. | |
| 11,225,420 B2 | 1/2022 | Borras et al. | |
| 11,312,646 B2 | 4/2022 | Gunasekaran et al. | |
| 11,345,620 B2 | 5/2022 | Zhu et al. | |
| 11,384,441 B2 | 7/2022 | Beddoes et al. | |
| 11,401,180 B2 | 8/2022 | Dejarme et al. | |
| 11,401,181 B1 | 8/2022 | Borras et al. | |
| 11,407,666 B2 | 8/2022 | Rosansky et al. | |
| 11,433,152 B2 | 9/2022 | Saue | |
| 11,512,011 B2 | 11/2022 | Huang et al. | |
| 11,512,012 B2 | 11/2022 | Chiang et al. | |
| 11,541,438 B2 | 1/2023 | Morrell | |
| 11,548,800 B2 | 1/2023 | Franceschi-hofmann et al. | |
| 11,584,665 B2 | 2/2023 | Green et al. | |
| 11,623,884 B1 | 4/2023 | Menon et al. | |
| 11,643,339 B2 | 5/2023 | Nelson | |
| 11,679,999 B2 | 6/2023 | Newell et al. | |
| 11,713,261 B2 | 8/2023 | Griffis et al. | |
| 11,780,746 B2 | 10/2023 | Duckworth et al. | |
| 11,780,753 B2 | 10/2023 | Dejarme et al. | |
| 11,896,948 B2 | 2/2024 | Chang et al. | |
| 2001/0000485 A1 | 4/2001 | Ying et al. | |
| 2003/0168411 A1 | 9/2003 | Hiro et al. | |
| 2003/0226803 A1 | 12/2003 | Kamiya et al. | |
| 2004/0151957 A1 | 8/2004 | Brooks et al. | |
| 2004/0251212 A1 | 12/2004 | Ikematsu et al. | |
| 2005/0011765 A1 | 1/2005 | Omasa | |
| 2005/0173262 A1 | 8/2005 | Nakanishi et al. | |
| 2006/0000784 A1 | 1/2006 | Khudenko | |
| 2006/0096853 A1 | 5/2006 | King | |
| 2006/0254929 A1 | 11/2006 | Mikio | |
| 2009/0120863 A1 | 5/2009 | Salama et al. | |
| 2009/0282627 A1 | 11/2009 | Porat | |
| 2010/0000924 A1 | 1/2010 | Hayashi et al. | |
| 2010/0051477 A1 | 3/2010 | Jeon et al. | |
| 2010/0126879 A1 | 5/2010 | Wilman et al. | |
| 2011/0223523 A1 | 9/2011 | Lopez et al. | |
| 2012/0037498 A1 * | 2/2012 | Pancurak | C02F 1/46109 204/248 |
| 2013/0162097 A1 | 6/2013 | Shinmoto et al. | |
| 2013/0180857 A1 | 7/2013 | Heffernan et al. | |
| 2013/0220919 A1 | 8/2013 | Bilbao et al. | |
| 2013/0277231 A1 | 10/2013 | Hanson-Greenberg | |
| 2014/0327239 A1 | 11/2014 | Stanley | |
| 2015/0001094 A1 | 1/2015 | Ibeid et al. | |
| 2015/0151985 A1 | 6/2015 | Johnson et al. | |
| 2018/0141836 A1 | 5/2018 | Hu et al. | |
| 2019/0002321 A1 | 1/2019 | Grönfors et al. | |
| 2019/0092653 A1 | 3/2019 | Arbeus et al. | |
| 2020/0010341 A1 | 1/2020 | Harvey et al. | |
| 2020/0029714 A1 | 1/2020 | Nguyen et al. | |
| 2020/0165149 A1 | 5/2020 | Zhu et al. | |
| 2020/0270149 A1 | 8/2020 | Bejan et al. | |
| 2020/0325041 A1 | 10/2020 | Cosentino et al. | |
| 2020/0369547 A1 | 11/2020 | Davy et al. | |
| 2021/0147265 A1 | 5/2021 | Andrews et al. | |
| 2021/0179456 A1 | 6/2021 | Borras et al. | |
| 2021/0188666 A1 | 6/2021 | Borras et al. | |
| 2021/0221717 A1 | 7/2021 | Buschmann | |
| 2022/0073380 A1 | 3/2022 | Schneider et al. | |
| 2022/0073383 A1 | 3/2022 | Borras et al. | |
| 2022/0081330 A1 | 3/2022 | Borras et al. | |
| 2022/0106208 A1 | 4/2022 | Borras et al. | |
| 2024/0010528 A1 | 1/2024 | Borras et al. | |

FOREIGN PATENT DOCUMENTS

| | | |
|---|---|---|
| CN | 2099752 | 3/1992 |
| CN | 104291415 | 1/2015 |
| CN | 205692940 | 11/2016 |
| CN | 107235537 | 10/2017 |
| CN | 207330680 | 5/2018 |
| CN | 209636053 | 11/2019 |
| CN | 114502512 | 5/2022 |
| CN | 114555214 | 5/2022 |
| CN | 117203166 A | 12/2023 |
| JP | S4988166 | 7/1974 |
| JP | S505669 | 3/1975 |
| JP | S5140380 | 4/1976 |
| JP | H10473 | 1/1998 |
| JP | H11277066 | 10/1999 |
| JP | 3072838 | 11/2000 |
| JP | 2001276849 | 10/2001 |
| JP | 2003225672 | 8/2003 |
| JP | 2004016868 | 1/2004 |
| JP | 2004066223 | 3/2004 |
| JP | 2005325437 | 11/2005 |
| JP | 2012011375 | 1/2012 |
| JP | 2022537699 | 8/2022 |
| JP | 2022538780 | 9/2022 |
| JP | 7237209 | 3/2023 |
| JP | 2024509544 | 3/2024 |
| JP | 7463409 | 4/2024 |
| PL | 224187 | 11/2016 |
| RU | 2029735 | 2/1995 |
| RU | 2142918 | 12/1999 |
| WO | WO-2000000670 A1 | 1/2000 |
| WO | WO-2004046042 A2 | 6/2004 |
| WO | WO-2008064460 A1 | 6/2008 |

(56) References Cited

FOREIGN PATENT DOCUMENTS

| | | |
|---|---|---|
| WO | 2011107984 | 9/2011 |
| WO | WO-2012048425 A1 | 4/2012 |
| WO | 2013017901 | 2/2013 |
| WO | WO-2013016821 A1 | 2/2013 |
| WO | WO-2013075240 A1 | 5/2013 |
| WO | WO-2014165998 A1 | 10/2014 |
| WO | WO-2016024408 A1 | 2/2016 |
| WO | WO-2016054749 A1 | 4/2016 |
| WO | 2020247029 | 12/2020 |
| WO | 2020252241 | 12/2020 |
| WO | 2020252242 | 12/2020 |
| WO | 2022186877 | 10/2022 |
| WO | WO-2023114025 A1 | 6/2023 |
| WO | 2023154555 | 8/2023 |
| WO | 2023205352 | 10/2023 |
| WO | 2023215271 | 11/2023 |
| WO | 2023244720 | 12/2023 |

OTHER PUBLICATIONS

"Chinese Application Serial No. 202080053751.3, Office Action mailed Mar. 9, 2023", W English Translation, 31 pgs.

"European Application Serial No. 20822476.6, Extended European Search Report mailed May 24, 2023", 10 pgs.

"European Application Serial No. 20821949.3, Extended European Search Report mailed May 24, 2023", 11 pgs.

Wei, V, "Nutrient removal in an electrically enhanced membrane Bioreactor", Water Science and Technology, vol. 60, No. 12, (Dec. 1, 2009), 3159-3163.

"Japanese Application Serial No. 2021-573824, Notification of Reasons for Refusal mailed Dec. 20, 2022", w English Translation, 11 pgs.

"Australian Application Serial No. 2020291450, Response filed Dec. 19, 2022 to First Examination Report mailed Oct. 28, 2022", 18 pgs.

"Japanese Application Serial No. 2021573769, Response filed Dec. 22, 2022 to Notification of Reasons for Refusal filed Oct. 4, 2022", w English claims, 14 pgs.

"Canadian Application Serial No. 3,140,014, Response filed Jan. 9, 2023 to Examiners Rule 86-2 Report mailed Sep. 20, 2022", 13 pgs.

"U.S. Appl. No. 17/533,522, Non Final Office Action mailed Jan. 26, 2023", 16 pgs.

"Canadian Application Serial No. 3,140,149, Examiners Rule 86(2) Requisition mailed Feb. 27, 2023", 3 pgs.

"Japanese Application Serial No. 2021-573824, Response filed Mar. 15, 2023 to Notification of Reasons for Refusal mailed Dec. 20, 2022", w English claims, 9 pgs.

"U.S. Appl. No. 17/533,522, Response filed Mar. 23, 2023 to Non Final Office Action mailed Jan. 26, 2023", 13 pgs.

"Australian Application Serial No. 2020291534, Response filed Mar. 23, 2023 to First Examination Report mailed Nov. 9, 2022", 10 pgs.

"International Application Serial No. PCT US2022 051651, International Search Report mailed Mar. 28, 2023", 2 pgs.

"International Application Serial No. PCT US2022 051651, Written Opinion mailed Mar. 28, 2023", 5 pgs.

"Canadian Application Serial No. 3,140,014, Examiners Rule 86-2 Report mailed Sep. 20, 2022", 5 pgs.

"Japanese Application Serial No. 2021573769, Notification of Reasons for Refusal filed Oct. 4, 2022", w English Translation, 6 pgs.

"Australian Application Serial No. 2020291450, First Examination Report mailed Oct. 28, 2022", 3 pgs.

"Australian Application Serial No. 2020291534, First Examination Report mailed Nov. 9, 2022", 4 pgs.

"Canadian Application Serial No. 3,140,149, Response filed Dec. 15, 2022 to Office Action mailed Aug. 29, 2022", 34 pgs.

"International Application Serial No. PCT US2020 037405, International Search Report mailed Sep. 14, 2020", 2 pgs.

"International Application Serial No. PCT US2020 037405, Written Opinion mailed Sep. 14, 2020", 9 pgs.

"International Application Serial No. PCT US2020 037407, International Search Report mailed Sep. 16, 2020", 2 pgs.

"International Application Serial No. PCT US2020 037407, Written Opinion mailed Sep. 16, 2020", 8 pgs.

"Enpurion EC-Electrocoagulation", enpurion https: enpurion.com empurion-ec , (Accessed on Feb. 9, 2021), 4 pgs.

"European Application Serial No. 20821949.3, Response filed Mar. 31, 2022 to Communication Pursuant to Rules 161(1) and 162 EPC mailed", 11 pgs.

"International Application Serial No. PCT US2021 064124, International Search Report mailed Aug. 17, 2022", 2 pgs.

"International Application Serial No. PCT US2021 064124, Written Opinion mailed Aug. 17, 2022", 7 pgs.

"Canadian Application Serial No. 3,140,149, Office Action mailed Aug. 29, 2022", 3 pgs.

Al-Qodah, Zakaria, "Combined electrocoagulation processes as a novel approach for enhanced pollutants removal: A state-of-the-art review", Science of the Total Environment 744, (2020), 14 pgs.

Bensadok, K, "Electrocoagulation of cutting oil emulsions using aluminium plate electrodes", Journal of Hazardous Materials 152, (2008), 423-430.

Dina, T Moussa, "A comprehensive review of electrocoagulation for water treatment:Potentials and challenges", Journal of Environmental Management 186, (2017), 24-41.

Gobbi, Lorena C.A., "Electrocoagulation with polarity switch for fast oil removal from oil in water emulsions", Journal of Environmental Management 213, (2018), 119-125.

Govindan, Kadarkarai, "Electrocoagulants Characteristics and Application of Electrocoagulation for Micropollutant Removal and Transformation Mechanism", ACS Appl Mater. Interfaces 12, (2020), 1775-1788.

Jizhou, L, "Pretreatment of dyestuff wastewater by internal microelectrolysis", International Conference on Electric Technology and Civil Engineering, (2011), 4 pgs.

Kabdasli, I, "Electrocoagulation applications for industrial wastewaters: a critical review", Environmental Technology Reviews, (Nov. 6, 2012), 45 pgs.

Kekedy-Nagy, Laszlo, "Electroless Production of Fertilizer (Struvite) and Hydrogen from Synthetic Agricultural Wastewaters", Journal of the American Chemical Society J. Am. Chem. Soc 142, (2020), 15 pgs.

Kuokkanen, Ville, "Recent Applictions of Electrocoagulation in Treatment of Water and Wastewater-A Review", Green and Sustainable Chemistry, (Jan. 2013), 34 pgs.

Luba, Mateusz, "Electrochemical Degradation of Industrial Dyes in Wastewater through the Dissolution of Aluminum Sacrificial Anode of Cu Al Macro-Corrosion Galvanic Cell", Molecules (18) 4108, (Sep. 25, 2020), 17 pgs.

Peng, Shuai, "Iron-carbon galvanic cells strengthened anaerobic anoxic oxic process(Fe C-A2O) for high-nitrogen phosphorus and low-carbon sewage treatment", Science of the Total Environment 722, (2020), 13 pgs.

Pierozynski, Boguslaw, "Electrochemical Degradation of Phenol and Resorcinol Molecules through the Dissolution of Sacrificial Anodes of Macro-Corrosion Galvanic Cells", Water 10:770, (2018), 10 pgs.

"U.S. Appl. No. 17/249,343, Corrected Notice of Allowability mailed Dec. 22, 2021", 3 pgs.

"U.S. Appl. No. 17/249,343, Final Office Action mailed Oct. 1, 2021", 16 pgs.

"U.S. Appl. No. 17/249,343, Non Final Office Action mailed Jun. 15, 2021", 17 pgs.

"U.S. Appl. No. 17/249,343, Notice of Allowance mailed Nov. 23, 2021", 10 pgs.

"U.S. Appl. No. 17/249,343, Response filed Jun. 7, 2021 to Restriction Requirement mailed Apr. 30, 2021", 10 pgs.

"U.S. Appl. No. 17/249,343, Response filed Sep. 7, 2021 to Non Final Office Action mailed Jun. 15, 2021", 21 pgs.

"U.S. Appl. No. 17/249,343, Response filed Nov. 4, 2021 to Final Office Action mailed Oct. 1, 2021", 15 pgs.

"U.S. Appl. No. 17/249,343, Restriction Requirement mailed Apr. 30, 2021", 7 pgs.

(56) References Cited

OTHER PUBLICATIONS

"U.S. Appl. No. 17/249,345, Corrected Notice of Allowability mailed Dec. 10, 2021", 4 pgs.
"U.S. Appl. No. 17/249,345, Non Final Office Action mailed Jun. 24, 2021", 26 pgs.
"U.S. Appl. No. 17/249,345, Notice of Allowance mailed Sep. 27, 2021", 12 pgs.
"U.S. Appl. No. 17/249,345, Response filed Jun. 7, 2021 to Restriction Requirement mailed May 3, 2021", 11 pgs.
"U.S. Appl. No. 17/249,345, Response filed Sep. 7, 2021 to Non Final Office Action mailed Jun. 24, 2021", 19 pgs.
"U.S. Appl. No. 17/249,345, Restriction Requirement mailed May 3, 2021", 8 pgs.
"U.S. Appl. No. 17/340,254, Advisory Action mailed Jan. 24, 2022", 3 pgs.
"U.S. Appl. No. 17/340,254, Final Office Action mailed Nov. 19, 2021", 10 pgs.
"U.S. Appl. No. 17/340,254, Non Final Office Action mailed Sep. 23, 2021", 10 pgs.
"U.S. Appl. No. 17/340,254, Notice of Allowability mailed Apr. 25, 2022", 3 pgs.
"U.S. Appl. No. 17/340,254, Notice of Allowance mailed Mar. 31, 2022", 7 pgs.
"U.S. Appl. No. 17/340,254, Response filed Jan. 5, 2022 to Final Office Action mailed Nov. 19, 2021". 14 pgs.
"U.S. Appl. No. 17/340,254, Response filed Feb. 21, 2022 to Advisory Action mailed Jan. 24, 2022", 18 pgs.
"U.S. Appl. No. 17/340,254, Response filed Nov. 4, 2021 to Non Final Office Action mailed Sep. 23, 2021", 15 pgs.
"International Application Serial No. PCT/US2020/037405, International Preliminary Report on Patentability mailed Dec. 23, 2021", 11 pgs.
"International Application Serial No. PCT/US2020/037407, International Preliminary Report on Patentability mailed Dec. 23, 2021", 10 pgs.
U.S. Appl. No. 17/249,343 U.S. Pat. No. 11,225,420, filed Feb. 26, 2021, Removal of Materials From Water.
U.S. Appl. No. 17/533,522, filed Nov. 23, 2021, Removal of Materials From Water.
U.S. Appl. No. 17/249,345 U.S. Pat. No. 11,220,443, filed Feb. 26, 2021, Removal of Phosphorus and Nitrogen From Water.
U.S. Appl. No. 17/530,907, filed Nov. 19, 2021, Removal of Phosphorus and Nitrogen From Water.
U.S. Appl. No. 17/340,254, filed Jun. 7, 2021, Galvanic Process for Treating Aqueous Compositions.
U.S. Appl. No. 17/554,229, filed Dec. 17, 2021, Removal of Materials from Water.
"U.S. Appl. No. 17/533,522, Non Final Office Action mailed Jun. 28, 2023", 28 pgs.
"Canadian Application Serial No. 3,140,014, Examiners Rule 86(2) Report mailed Jul. 17, 2023", 3 pgs.
"Canadian Application Serial No. 3,140,149, Response filed Jun. 8, 2023 to Examiners Rule 86(2) Requisition mailed Feb. 27, 2023", 33 pgs.
"Chinese Application Serial No. 202080053751.3, Response filed Aug. 3, 2023 to Office Action mailed Mar. 9, 2023", w/ English claims, 11 pgs.
"International Application Serial No. PCT/US2021/064124, International Preliminary Report on Patentability mailed Sep. 14, 2023", 9 pgs.
"Japanese Application Serial No. 2021-573824, Final Notification of Reasons for Refusal mailed Sep. 5, 2023", w/ English Translation, 14 pgs.
"Japanese Application Serial No. 2021-573824, Response filed Jul. 3, 2023 to Final Notification of Reasons for Refusal mailed Apr. 4, 2023", w/ English claims, 10 pgs.
"Canadian Application Serial No. 3,140,014, Examiners Rule 86(2) Report mailed Feb. 9, 2024", 4 pgs.
"U.S. Appl. No. 17/530,907, Non Final Office Action mailed Jan. 10, 2024", 32 pgs.
"U.S. Appl. No. 17/533,522, Final Office Action mailed Dec. 26, 2023", 30 pgs.
"U.S. Appl. No. 17/533,522, Response filed Sep. 22, 2023 to Non Final Office Action mailed Jun. 28, 2023", 16 pgs.
"Canadian Application Serial No. 3,140,014, Response filed Oct. 25, 2023 to Examiners Rule 86(2) Report mailed Jul. 17, 2023", 25 pgs.
"Chinese Application Serial No. 202080053739.2, Office Action mailed Nov. 29, 2023", w/ English Translation, 27 pgs.
"Chinese Application Serial No. 202080053751.3, Office Action mailed Sep. 14, 2023", w/ English Translation, 26 pgs.
"Chinese Application Serial No. 202080053751.3, Response filed Dec. 26, 2023 to Office Action mailed Sep. 14, 2023", w/ English claims, 13 pgs.
"European Application Serial No. 20821949.3, Response filed Dec. 5, 2023 to Extended European Search Report mailed May 24, 2023", 18 pgs.
"European Application Serial No. 20822476.6, Response filed Dec. 5, 2023 to Extended European Search Report mailed May 24, 2023", 18 pgs.
"Japanese Application Serial No. 2021-573824, Response filed Dec. 1, 2023 to Final Notification of Reasons for Refusal mailed Sep. 5, 2023", W/English Claims, 9 pgs.
"Ship Corrosion Protection Technology", Ha'erbin: Harbin Engineering University Press Abstract with English Translation, (Feb. 28, 2011), 10 pgs.
"International Application Serial No. PCT US2023 019295, International Search Report mailed Jul. 21, 2023", 2 pgs.
"International Application Serial No. PCT US2023 019295, Written Opinion mailed Jul. 21, 2023", 9 pgs.
"International Application Serial No. PCT US2023 025390, International Search Report mailed Sep. 20, 2023", 2 pgs.
"International Application Serial No. PCT US2023 025390, Written Opinion mailed Sep. 20, 2023", 6 pgs.
"U.S. Appl. No. 17/533,522, Response filed Feb. 23, 2024 to Final Office Action mailed Dec. 26, 2023", 18 pgs.
"U.S. Appl. No. 17/533,522, Advisory Action mailed Mar. 8, 2024", 4 pgs.
"Canadian Application Serial No. 3,140,149, Examiners Rule 86(2) Report mailed Mar. 13, 2024", 7 pgs.
"Treatment Technologies for Per- and Polyfluoroalkyl Substances (PFAS)", Fact Sheet, (Sep. 2023), 4 pgs.
"Chinese Application Serial No. 202080053751.3, Office Action mailed Feb. 27, 2024", w English translation, 29 pgs.
"Australian Application Serial No. 2021430769, First Examination Report mailed Mar. 22, 2024", 3 pgs.
"U.S. Appl. No. 17/530,907, Response filed Mar. 22, 2024 to Non Final Office Action mailed Jan. 10, 2024", 18 pgs.
"Canadian Application Serial No. 3208736, Voluntary Amendment filed Mar. 18, 2024", 7 pgs.
"European Application Serial No. 21929411.3, Response to Communication pursuant to Rules 161(2) and 162 EPC filed Apr. 5, 2024", 19 pgs.
"U.S. Appl. No. 17/533,522, Response filed Apr. 23, 2024 to Advisory Action mailed Mar. 8, 2024", 21 pgs.
"Chinese Application Serial No. 202180097592.1, Office Action mailed Apr. 2, 2024", W English Translation, 22 pgs.
"Canadian Application Serial No. 3,208,736, Examiners Rule 86(2) Requisition mailed May 6, 2024", 5 pgs.
"Canadian Application Serial No. 3,140,014, Response filed May 27, 2024 to Examiners Rule 86(2) Report mailed Feb. 9, 2024", 25 pgs.
"Canadian Application Serial No. 3,140,149, Response filed Jun. 7, 2024 to Examiners Rule 86(2) Report mailed Mar. 13, 2024", 38 pgs.
Deng, Shubo, "Removal of perfluorooctanoate from surface water by polyaluminium choloride coagulation", Water Research vol. 45 Issue 4 1774-1780, (Feb. 2011), 5 pgs.
Garg, Shafali, "Remediation of water from per- poly-fluoroalkyl substances (PFAS)-Challenges and perspectives", Journal of Environmental Chemical Engineering 9, (2021), 25 pgs.

(56) References Cited

OTHER PUBLICATIONS

Hubert, Michel, "Per- and polyfluoroalkyl substance (PFAS) removal from soil washing water by coagulation and flocculation", Water Research 249, (2023), 10 pgs.

Lu, Xinyu, "Adsorption behavior and mechanism of perfluorooctane sulfonate on nanosized inorganic oxides", Journal of Colloid and Interface Science vol. 474 pp. 199-205, (Jul. 15, 2016), 6 pgs.

Malik, Qasim H, "Performance of alum and assorted coagulants in turbidity removal of muddy water", Applied Water Science, (2018), 4 pgs.

Merino, Nancy, "Degradation and Removal Methods for Perfluoroalky and Polyfluoroalkyl Substances in Water", Environmental Engineering Science vol. 33, No. 9, (Sep. 1, 2016), 60 pgs.

Xiao, Feng, "Mechanisms for removal of perfluorooctane sulfonate (PFOS) and perfluorooctanoate (PFOA) from drinking water by conventional enhances coagulation", Water Research vol. 47, Issue 1 pp. 49-56, (Jan. 1, 2013), 6 pgs.

Zhang, D Q, "Adsorption of perfluoroalkyl and polyfluoroalkyl substances (PFASs) from aqueous solution—A review", Science of the Total Environment 694, (2019), 19 pgs.

Zhang, Mingkun, "Aluminum-based electrocoagulation for residual fluoride removal during per-and polyfluoroalkyl substances (PFASs) wastewater treatment", Separation and Purification Technology vol. 308, (Mar. 2023), 7 pgs.

Zhang, Zhiming, "Adsorption of perfluorooctanoic acid (PFOA) and perfluorooctanesulfonic acid (PFOS) by aluminum-based drinking water treatment residuals", Journal of Hazardous Materials Letters, (2021), 6 pgs.

"U.S. Appl. No. 18/628,020, Notice of Allowance mailed Jun. 20, 2024", 9 pgs.

"International Application Serial No. PCT US2022 051651, International Preliminary Report on Patentability mailed Jun. 27, 2024", 7 pgs.

"U.S. Appl. No. 18/628,020, Supplemental Notice of Allowability mailed Jul. 5, 2024", 2 pgs.

"Chinese Application Serial No. 202080053739.2, Office Action mailed Jun. 13, 2024", W English Translation, 11 pgs.

"U.S. Appl. No. 18/628,119, Notice of Allowance mailed Jul. 9, 2024", 12 pgs.

"U.S. Appl. No. 17/533,522, Non Final Office Action mailed Jul. 10, 2024", 28 pgs.

"U.S. Appl. No. 17/530,907, Final Office Action mailed Jul. 15, 2024", 9 pgs.

"Chinese Application Serial No. 202080053751.3, Response filed Apr. 29, 2024 to Office Action mailed Feb. 27, 2024", w English claims, 21 pgs.

"Chinese Application Serial No. 202080053751.3, Office Action mailed May 29, 2024", W English Translation, 23 pgs.

"Japanese Application Serial No. 2023-553408, Notification of Reasons for Rejection mailed Jul. 23, 2024", W English Translation, 10 pgs.

"Chinese Application Serial No. 202180097592.1, Response filed Aug. 1, 2024 to Office Action mailed Apr. 2, 2024", w current English claims, 8 pgs.

\* cited by examiner

GALVANIC PROCESS FOR TREATING AQUEOUS COMPOSITIONS

CROSS-REFERENCE TO RELATED APPLICATION

This application claims the benefit of priority to U.S. Provisional Patent Application Ser. No. 63/155,338 filed Mar. 2, 2021, the disclosure of which is incorporated herein in its entirety by reference.

BACKGROUND

Electrolytic treatment of aqueous compositions using an electrochemical cell has a wide variety of applications, including electrocoagulation, breaking of emulsions, and oxidation and/or elimination of metals such as heavy metals. Electrolytic treatment can be used for treatment of wastewater, wash water, and industrial processed water. In some applications, electrolytic treatment can be used to remove contaminants that are more difficult to remove by filtration or chemical treatment systems, such as emulsified oil, total petroleum hydrocarbons, refractory organics, suspended solids, and heavy metals. However, an electrolytic process requires large amounts of electricity to energize the electrochemical cell, which results in rapid passivation and consumption of anodic material.

SUMMARY OF THE INVENTION

Various embodiments of the present invention provide a method of treating an aqueous composition. The method includes immersing a galvanic cell in the aqueous composition to form a treated aqueous composition. The galvanic cell includes an anode including Mg, Al, Fe, Zn, or a combination thereof. The galvanic cell includes a cathode having a different composition than the anode, the cathode including Cu, Ni, Fe, or a combination thereof Various embodiments of the present invention provide a method of treating an aqueous composition. The method includes immersing a galvanic cell in the aqueous composition to form a treated aqueous composition. The galvanic cell includes an anode including Al, wherein the anode is about 90 wt % to about 100 wt % Al. The galvanic cell includes a cathode including Cu, wherein the cathode is about 90 wt % to about 100 wt % Cu. The galvanic cell includes a conductive connector that electrically connects the anode and the cathode, the conductive connector including an alloy including Cu and Zn.

Various embodiments of the present invention provide a method of coagulating and/or precipitating suspended solids from an aqueous composition. The method includes immersing a galvanic cell in the aqueous composition to form a treated aqueous composition including coagulated and/or precipitated suspended solids from the aqueous composition. The galvanic cell includes an anode including Al, wherein the anode is about 90 wt % to about 100 wt % Al. The galvanic cell includes a cathode including Cu, wherein the cathode is about 90 wt % to about 100 wt % Cu. The galvanic cell includes a conductive connector that electrically connects the anode and the cathode, the conductive connector including an alloy including Cu and Zn. The method includes removing the coagulated and/or precipitated suspended solids from the treated aqueous composition.

Various embodiments of the present invention provide a method of reducing or eliminating an emulsion from an aqueous composition. The method includes immersing a galvanic cell in the aqueous composition including an oil/water and/or water/oil emulsion to reduce or eliminate the emulsion from the aqueous composition and to form a treated aqueous composition. The galvanic cell includes an anode including Al, wherein the anode is about 90 wt % to about 100 wt % Al. The galvanic cell includes a cathode including Cu, wherein the cathode is about 90 wt % to about 100 wt % Cu. The galvanic cell includes a conductive connector that electrically connects the anode and the cathode, the conductive connector including an alloy including Cu and Zn.

Various embodiments of the present invention provide a method of reducing chemical oxygen demand of an aqueous composition. The method includes immersing a galvanic cell in the aqueous composition to reduce or eliminate the chemical oxygen demand of the aqueous composition and to form a treated aqueous composition. The galvanic cell includes an anode including Al, wherein the anode is about 90 wt % to about 100 wt % Al. The galvanic cell includes a cathode including Cu, wherein the cathode is about 90 wt % to about 100 wt % Cu. The galvanic cell includes a conductive connector that electrically connects the anode and the cathode, the conductive connector including an alloy including Cu and Zn.

Various embodiments of the present invention provide a method of reducing or eliminating silica from an aqueous composition. The method includes immersing a galvanic cell in the aqueous composition to reduce or eliminate silica in the aqueous composition and to form a treated aqueous composition. The galvanic cell includes an anode including Al, wherein the anode is about 90 wt % to about 100 wt % Al, The galvanic cell includes a cathode including Cu, wherein the cathode is about 90 wt % to about 100 wt % Cu. The galvanic cell includes a conductive connector that electrically connects the anode and the cathode, the conductive connector including an alloy including Cu and Zn.

In various embodiments, the galvanic process of the present invention provides a replacement for electrolytic treatment of aqueous compositions, such as electrolytic electrocoagulation or other electrolytic treatments. The galvanic process has an advantage of using no applied external potential across the anode and cathode, as contrasted with an electrolytic process which requires an external potential to be applied across the anode and cathode. In various embodiments, the galvanic process of the present invention uses less electricity as compared to an electrolytic process to perform the same or similar treatment function. In various embodiments, the galvanic process of the present invention can be used to perform the same or similar treatment function as an electrolytic process but at a lower overall cost (e.g., consuming less electricity, and optionally using less expensive materials and/or equipment). In various embodiments, the low electrical currents of the galvanic process of the present invention avoids the passivation of the anodic surface, results in a lower rate of consumption of the anodic material, prevents the presence of unwanted chemical reactions (e.g., formation of chlorates or bromates), or a combination thereof.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1A:
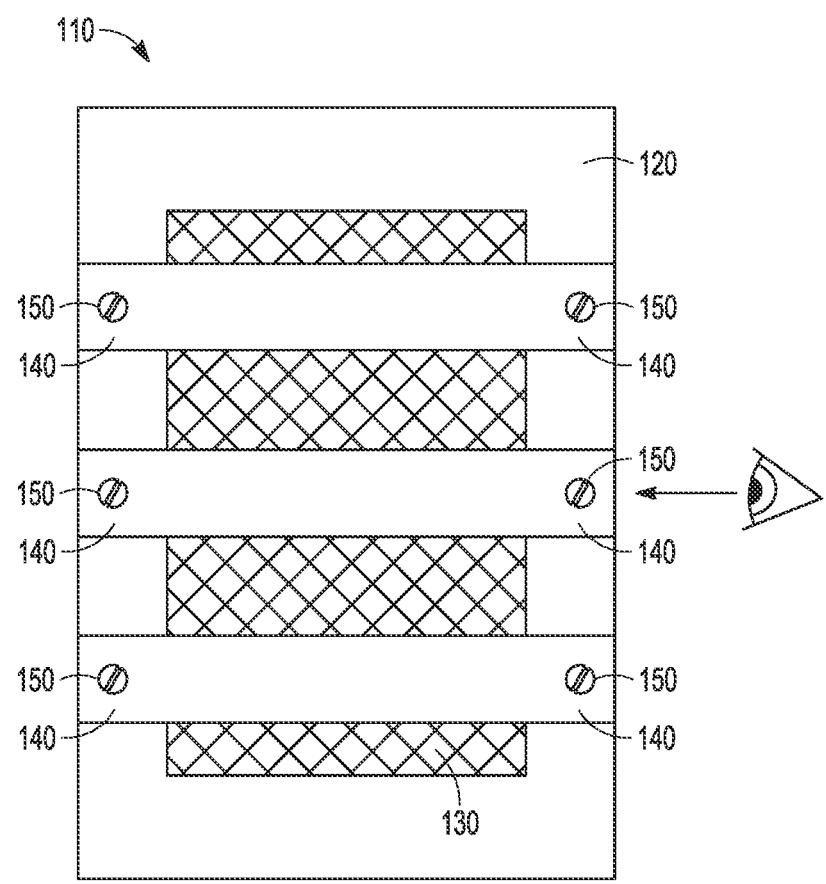
FIG. 1A illustrates a galvanic cell viewed from a major face, according to various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%. 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%. 97%, 98%, 99%, 99. 99.9%, 99 99%, or at least about 99.999% or more, or 100%. The term "substantially free of" as used herein can mean having none or having a trivial amount of such that the amount of material present does not affect the material properties of the composition including the material, such that about 0 wt % to about 5 wt % of the composition is the material, or about 0 wt % to about 1 wt %, or about 5 wt % or less or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

The disclosures of PCT/US2020/037405 and of PCT/US2020/037407 are hereby incorporated by reference in their entirety.

Method of Treating an Aqueous Composition.

Various embodiments of the present invention provide a method of treating an aqueous composition. The method includes immersing a galvanic cell in the aqueous composition to form a treated aqueous composition. The galvanic cell includes an anode including Mg, Al, Fe, Zn, or a combination thereof. The galvanic cell includes a cathode having a different composition than the anode, the cathode including Cu, Ni, Fe, or a combination thereof. The method can include immersing one of the galvanic cells in the aqueous composition or immersing a plurality of the galvanic cells in the aqueous composition.

The method includes operating the galvanic cell as a galvanic cell. Operating the galvanic cell as a galvanic cell includes an application of zero external potential (0 V) across the anode and the cathode of the galvanic cell. During operation of the galvanic cell as a galvanic cell, an electrical potential between the anode and the cathode is equal to the galvanic corrosion potential of the galvanic cell (e.g., the potential the anode and cathode reach with no external potential applied thereto when immersed in the aqueous composition).

The immersing of the galvanic cell in the aqueous composition can include partial immersion, such that any suitable proportion of the surface area of the galvanic cell is in contact with the aqueous composition, such as about 1% to about 100% of the surface area of the anode and cathode, 80% to about 100%, or less than, equal to, or greater than about 1%, 10, 20, 30, 40, 50, 60, 70, 80, 90, 95, 96, 97, 98, or about 99% or more. The immersing of the galvanic cell in the aqueous composition can include complete immersion, such that about 100% of the surface area of the galvanic cell is in contact with the aqueous composition.

In various embodiments, the method of treating the aqueous composition eliminates or reduces an emulsion in the aqueous composition, coagulates and/or precipitates suspended solids from the aqueous composition, removes or decreases the concentration of one or more organic compounds in the aqueous composition, removes or decreases the concentration of one or more inorganic compounds in the aqueous composition, removes or decreases the concentration of one or more dyes and/or inks in the aqueous composition, removes or decreases the concentration of one or more metals in the aqueous composition, removes or decreases the concentration of one or more heavy metals, removes or decreases the concentration of one or more toxic compounds and/or materials in the aqueous composition, removes or decreases the concentration of fluoride in the aqueous composition, removes or decreases the concentration of sulfide in the aqueous composition, removes or decreases the concentration of arsenic in the aqueous composition, reduces the chemical oxygen demand (COD) of the aqueous composition, reduces the turbidity of the aqueous composition, removes or decreases the concentration of silica in the aqueous composition (e.g., $SiO_3^{2-}$), or a combination thereof.

The method can coagulate and/or precipitate suspended solids from the aqueous composition. The method can be used as a replacement for a traditional electrolytic electrocoagulation process. The aqueous composition can include suspended solid particles, the treated aqueous composition can have a lower concentration of the suspended solid particles than the aqueous composition. The method can further include removing coagulated materials and/or precipitates from the treated aqueous composition. The removing can be any suitable removing, such as decantation, settling, filtration, or a combination thereof. In an electrolytic electrocoagulation process the oxidation of the contaminants occurs at the anode (Fe, Al, Zn, and the like) with the generation of hydrogen gas at the cathode. This is similar to what occurs in the galvanic process, however the application of external current in electrolytic electrocoagulation increases the polarization of the electrodes, causing new chemical reactions such as the generation of gaseous oxygen and chlorine if there are chloride ions in solution. The galvanic method of coagulating and/or precipitating suspended solids from solution can be an economically advantageous substitute for the electrolytic electrocoagulation process for the treatment of effluents through adsorption-coagulation and cathodic reduction processes. In some embodiments, such as using a Mg anode and Cu cathode, the method of galvanic treatment can generate chlorine gas (e.g., by connecting at least two galvanic cells in series)

The method of treating the aqueous composition can reduce or eliminate emulsions therein. The aqueous composition can include an oil/water, a water/oil emulsion, and/or a latex emulsion and wherein the treated aqueous composition includes less oil/water, water/oil emulsion, and/or latex emulsion than the aqueous composition.

The method of treating the aqueous composition can remove or decrease the concentration of one or more organic compounds the aqueous composition. The treated aqueous composition can have a lower concentration of the one or more organic compounds than the aqueous composition. The removal or decrease can occur via any suitable mechanism, For example, the method can chemically transform the organic compounds, degrade the organic compounds, oxidize the organic compounds, reduce the organic compounds, precipitate the organic compounds, coagulate the organic compounds, react the organic compounds with oxygen, react the organic compounds with chlorine, react the organic compounds with one or more ions generated at the anode and/or cathode, or a combination thereof.

The method of treating the aqueous composition can remove or decrease the concentration of one or more inorganic compounds in the aqueous composition. The treated aqueous composition can have a lower concentration of the one or more inorganic compounds than the aqueous composition. The removal or decrease can occur via any suitable mechanism. For example, the method can chemically transform the inorganic compounds, degrade the inorganic compounds, oxidize the inorganic compounds, reduce the inorganic compounds, precipitate the inorganic compounds, coagulate the inorganic compounds, react the inorganic compounds with oxygen, react the inorganic compounds with chlorine, react the inorganic compounds with one or more ions generated at the anode and/or cathode, or a combination thereof.

The method of treating the aqueous composition can remove or decrease the concentration of one or more dyes and/or inks in the aqueous composition. The treated aqueous composition can have a lower concentration of the one or more dyes and/or inks than the aqueous composition. The removal or decrease can occur via any suitable mechanism. For example, the method can chemically transform the one or more dyes and/or inks, degrade the one or more dyes and/or inks, oxidize the one or more dyes and/or inks, reduce the one or more dyes and/or inks, precipitate the one or more dyes and/or inks, coagulate the one or more dyes and/or inks, react the one or more dyes and/or inks with oxygen, react the one or more dyes and/or inks with chlorine, react the one or more dyes and/or inks with one or more ions generated at the anode and/or cathode, or a combination thereof. The dye can be any suitable dyes that can be removed using the method. For example, the dye can be an azo dye, such as methyl orange and/or Orange II. The method can remove any suitable amount of the dye molecule, such as 10-100%, 50-100%, 80-100%, or less than, equal to, or greater than 10%, 20, 30, 40, 50, 60, 65, 70, 75, 80, 85, 90, or 95% or more.

The method of treating the aqueous composition can remove or decrease the concentration of one or more metals in the aqueous composition. The treated aqueous composition can have a lower concentration of the one or more metals than the aqueous composition. The removal or decrease can occur via any suitable mechanism For example, the method can chemically transform the one or more metals, degrade the one or more metals, oxidize the one or more metals, reduce the one or more metals, precipitate the one or more metals, coagulate the one or more metals, react the one or more metals with oxygen, react the one or more metals with chlorine, react the one or more metals with one or more ions generated at the anode and/or cathode, or a combination thereof.

The method of treating the aqueous composition can remove or decrease the concentration of one or more heavy metals in the aqueous composition. The treated aqueous composition can have a lower concentration of the one or more metals than the aqueous composition. The removal or decrease can occur via any suitable mechanism. For example, the method can chemically transform the one or mote heavy metals, degrade the one or more heavy metals, oxidize the one or more heavy metals, reduce the one or more heavy metals, precipitate the one or more heavy metals, coagulate the one or more heavy metals, react the one or more heavy metals with oxygen, react the one or more heavy metals with chlorine, react the one or more heavy metals with one or more ions generated at the anode and/or cathode, or a combination thereof.

The method of treating the aqueous composition can remove or decrease the concentration of one or more toxic compounds and/or materials in the aqueous composition. The treated aqueous composition can have a lower concentration of the one or more toxic compounds and/or materials than the aqueous composition. The removal or decrease can occur via any suitable mechanism. For example, the method can chemically transform the one or more toxic compounds and/or materials, degrade the one or more toxic compounds and/or materials, oxidize the one or more toxic compounds and/or materials, reduce the one or more toxic compounds and/or materials, precipitate the one or more toxic compounds and/or materials, coagulate the one or more toxic compounds and/or materials, react the one or more toxic compounds and/or materials with oxygen, react the one or more toxic compounds and/or materials with chlorine, react the one or more toxic compounds and/or materials with one or more ions generated at the anode and/or cathode, or a combination thereof.

The method of treating the aqueous composition can remove or decrease the concentration of fluoride, sulfide, arsenic, or a combination thereof, in the aqueous composition The treated aqueous composition can have a lower concentration of the fluoride, sulfide, arsenic, or a combination thereof, than the aqueous composition. The removal or decrease can occur via any suitable mechanism For example, the method can chemically transform the fluoride, sulfide, arsenic, or a combination thereof; degrade the fluoride, sulfide, arsenic, or a combination thereof; oxidize the fluoride, sulfide, arsenic, or a combination thereof; reduce the fluoride, sulfide, arsenic, or a combination thereof; precipitate the fluoride, sulfide, arsenic, or a combination thereof; coagulate the fluoride, sulfide, arsenic, or a combination thereof; react the fluoride, sulfide, arsenic, or a combination thereof with oxygen; react the fluoride, sulfide, arsenic, or a combination thereof with chlorine, react the fluoride, sulfide, arsenic, or a combination thereof with one or more ions generated at the anode and/or cathode, or a combination thereof.

In various embodiments, the method can reduce the chemical oxygen demand (COD) of the aqueous composition, reduce the turbidity of the aqueous composition, or a combination thereof. The treated aqueous composition can have a reduced COD. a reduced turbidity, or a combination thereof, as compared to the aqueous composition. For example, the method can reduce the COD of the aqueous composition by 1% to 100%, or 1% to 99%, or 3% to 95%, or 5% to 85%, or less than or equal to 100% and greater than or equal to 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%. For example, the method can reduce the turbidity of the aqueous composition (e.g., an oil/water or water/oil emulsion) by 1% to 100%, or 1% to 99.99%, or 80% to 99.99%, or 90% to 99.99%, or less than or equal to 100% and greater than or equal to 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%.

In various embodiments, the method can reduce or eliminate silica from the aqueous composition. For example, the method can reduce the concentration of $SiO_3^{2-}$ in the aqueous composition by 1% to 100%, or 20% to 90%, or 30% to 80%, or 40% to 70%, or less than or equal to 100% and greater than or equal to 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%.

The aqueous composition treated with the method can be any suitable aqueous composition, such as including wastewater and/or effluent from: food processing, a landfill, a laundry process (e.g., detergent effluent), an industrial pulp or paper process, an industrial mining process, an industrial textile process, a metal-processing process, a metal-polishing process, a metalworking process, an industrial process in the tanning industry, a petroleum industrial process, marine wastewater (e.g., emulsion removal), or a combination thereof The aqueous composition can includes water taken from a source including a natural source of water in the environment, drinking water, industrial wastewater, industrial cooling water, or a combination thereof.

The paper industry consumes large volumes of water and has high organic contamination constituency composed of suspended solids and strong color from lignin degraded. compounds and tannin. The aqueous composition treated with the method of the present invention can include wastewater and/or effluent from an industrial pulp or paper process. The method of the present invention can destabilize and thereby reduce or eliminate colloidal solutions. In various embodiments, the newly amorphous Al (x $H_2O$) that can form from the anode in the galvanic cell can have a large surface area that enhances the adsorption of soluble organic compounds, trap colloidal solids and thereby provide reduction of COD, color, and/or turbidity.

In the textile industry, the removal of colorants has been reported when Al and Fe electrodes have been used in electrocoagulation systems. The aqueous composition treated with the method of the present invention can include wastewater and/or effluent from an industrial textile process. The galvanic cell can produce the same effect with the advantage of the absence of external energy application, which can significantly reduce the passivation processes, and a lower consumption rate of the anode, such as at least 10 times less with respect to an electrolytic electrocoagulation process. Experiments carried out in our laboratory have verified that the aluminum galvanic process has great effectiveness in the removal of dye molecules, such as azo dyes, such as methyl orange and Orange II. Use of the method to treat water samples from treatment plants caused a decrease of COD and a decrease in turbidity.

The aqueous composition treated with the method of the present invention can include wastewater and/or effluent from a metal-processing process, a metal-polishing process, or a metalworking process. The galvanic Mg—Cu process can be suitable for the treatment of effluents with high contents of metal ions (for example, bearing, and electroplating industries). The Mg—Cu galvanic cell can remove metal ions through two ways: for those metal ions with low electrochemical reduction potentials an increase in the pH of the water can result in its precipitation as oxides or hydroxides, such as lead ions; and the more noble metals, such as mercury, can be removed via their deposition on the cathode surface Mercury has stringent environmental regulations and thus a very high value is associated with its removal.

The galvanic method of the present invention can reduce the COD, turbidity, and the concentration of metals present in the waste and byproduct streams from tanning industrial processes Adsorption-coagulation processes can decrease the stability of the colloidal particles present in these waters, generating larger particles that can be settled or filtered reducing turbidity. A similar effect can occur with fats, grease, and organic matter in general, causing a decrease in COD in the system. Metals present such as $Cr^{6+}$ and $Cr^{3+}$ can be reduced on the cathode surface and the use of the galvanic Mg cell can produce an increase in pH from an acid range to basic which can cause the precipitation at metallic hydroxides.

For example, the aqueous composition treated by the method of the present invention can include wastewater and/or effluent from food processing, a laundry process (e.g., detergent effluent), a metal-processing process, a metal-polishing process, a metalworking process, a petroleum industrial process, marine wastewater (e.g., emulsion removal), or a combination thereof. The food processing, petroleum, metalworking, and marine industries can generate wastewater with the presence of stable oil-water emulsions which cannot be treated by traditional decontamination methods In various embodiments of the present invention, the presence of hydrolyzed aluminum particles can interact with the emulsion, producing a decrease in free energy at the oil/water interface and thereby causing its breakdown. The main destabilization mechanism can be the attachment of adsorbing macromolecules to more than one droplet at a time (e.g., bridging flocculation). The method can cause a decrease in interfacial tension that stabilizes the emulsion, thereby decreasing or eliminating the emulsion. The method can be used to economically remove or decrease emulsions in large quantities of wastewater.

The immersing of the galvanic cell in the aqueous composition can form a salt including a material from the aqueous composition (e.g., any suitable material in the aqueous composition that can form a salt, such as materials originally present in the aqueous composition and/or reaction products thereof formed during the operation of the galvanic cell) and a material from the anode (i.e., a material produced at the anode during operation of the galvanic cell). The salt can be any suitable salt. For example, the salt can include a hydroxide salt. The salt can precipitate in the aqueous composition. The method can include removing the precipitated salt from the treated aqueous composition.

The aqueous composition can include a dissolved transition metal, post-transition metal, metalloid, or a combination thereof, further including forming a hydroxide salt including the transition metal, post-transition metal, or metalloid during the immersing of the galvanic cell in the aqueous composition. The salt can precipitate in the aqueous composition. The method can include removing the precipitated salt from the treated aqueous composition. The transition metal, post-transition metal, or metalloid can include Sc, Y, Ti, V, Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, In, Sn, Hg, Tl, Pb, Bi, Po, Cn, B, Si, Ge, As, Sb, Te, At, or a combination thereof. The transition metal, post-transition metal, or metalloid can include Hg, Fe, Cr, Ni, Zn, Cd, As, or a combination thereof.

The method can include forming $H_2$ and $HO^-$ at the anode (e.g., generate on the surface of the anode) during the immersing of the galvanic cell in the aqueous composition. The method can include forming $H_2$ and $HO^-$ at the cathode (e.g., generate on the surface of the cathode) during the immersing of the galvanic cell in the aqueous composition. The method can include forming $H_2O_2$, $HO_2^-$, or a combination thereof at the cathode (e.g., generate on the surface of the cathode) during the immersing of the galvanic cell in the aqueous composition. The method can include applying shear to the aqueous composition during the immersing of the galvanic cell in the aqueous composition. The shear can be sufficient to dislodge at least some bubbles (e.g., $H_2$) from the surface of the anode, cathode, or a combination thereof. The shear can be sufficient to at least partially prevent or reduce oxide formation at the surface of the anode and/or cathode. The application of shear can include agitating and/or bubbling a gas (e.g., air) through the aqueous composition. In various embodiments, agitation or bubbling a gas can increase the concentration of dissolved oxygen in the aqueous composition, can at least partially polarize the cathode, can increase the amount of electrical current generated, and/or can increase the amount of material released from the anode (e.g., Mg, Al, Fe, Zn, or a combination thereof).

The method can include applying a mechanical force to the aqueous composition and/or to the galvanic cell while immersed therein, such as rapping, knocking, agitating, vibration, ultrasound, and the like. The mechanical force can be sufficient to dislodge at least some bubbles including $H_2$ from the surface of the anode, cathode, or a combination thereof; at least partially prevent oxide formation at the surface of the anode; at least partially prevent agglomeration of a salt and/or coagulated particles formed in the aqueous composition during treatment with the galvanic cell on the surface of the anode, or a combination thereof.

The method can include adding acid, base, or a combination thereof to the aqueous composition to adjust the pH thereof. The acid, base, or combination thereof can be added to the aqueous composition before the immersing of the galvanic cell in the aqueous composition, during the immersing of the galvanic cell in the aqueous composition, after the immersing of the galvanic cell in the aqueous composition, or a combination thereof.

The method can include recirculating the aqueous composition to contact the aqueous composition with the galvanic cell multiple times. The aqueous composition can optionally be filtered during the recirculation, such as to remove salts and/or coagulated particles therefrom.

The cathode of the galvanic cell can include Cu, Ni, Fe, or a combination thereof, such as Cu or a Cu alloy. The cathode can be a solid material that is predominantly Cu, Ni, Fe, alloys thereof, or a combination thereof, or another material that is coated with predominantly Cu, Ni, Fe, alloys thereof, or a combination thereof. The cathode can be substantially free of materials other than Cu, Ni, Fe, alloys thereof, or a combination thereof. The cathode can include Ni—Cu alloy, a Ni—Fe alloy, a Cu—Fe alloy, or a combination thereof; in some embodiments, use of a copper or iron alloy can increase the current produced in the galvanic cell and can increase hydrogen production. The cathode can be about 50 wt % to about 100 wt % Cu, Ni, Fe, alloys thereof, or a combination thereof, about 90 wt % to about 100 wt %, or less than, equal to, or greater than about 50 wt %, 55, 60, 65, 70, 75, 80, 82, 84, 86, 88, 90, 91, 92, 93, 94, 95, 96, 97, 98, 99, 99.5, 99.9, 99.99, or about 99.999 wt % or more. In some embodiments, the cathode includes Cu and the anode includes Mg. In some embodiments, the cathode includes Cu and the anode includes Al. The cathode can include one or more noble metals deposited thereon, such as on a cathode including copper. The one or more noble metals can be a particulate deposition. The one or more noble metals can be Pt, Pb, or a combination thereof. In other embodiments, the cathode is free of noble metal deposits thereon.

The anode can be a solid material of approximately homogeneous composition or can be a coating on another material. The anode has a different composition than the cathode. The anode can include Mg, Al, Fe, Zn, or a combination thereof. The anode can include an alloy that includes Mg, Al, Fe, Zn, or an alloy thereof. The Mg, Al, Fe, Zn, alloys thereof, or combinations thereof, can be about 50 wt % to about 100 wt % of the anode, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more. The anode can be substantially free of materials other than Mg, Al, Fe, Zn, alloys thereof, or combinations thereof.

The anode can further include Ag, Pt, Au, or a combination thereof. The Ag, Pt, Au, or the combination thereof is about 0,0001 wt % to about 20 wt %, about 0.0001 wt % to about 5 wt %, or about 0 wt %, or about 0.0001 wt % or less, or 0.0002, 0.0004, 0.0006, 0.0008, 0.0010, 0.0012, 0.0014, 0.0016, 0.0018, 0.0020, 0.0022, 0.0024, 0.0026, 0.0028, 0.0030, 0.0032, 0.0034, 0.0036, 0.0038, 0.0040, 0.0045, 0.0050, 0.0060, 0.0080, 0.01, 0.02, 0.04, 0.06, 0.08, 0.1, 0.2, 0.4, 0.6, 0.8, 1, 1.5, 2, 4, 6, 8, 10, 12, 14, 16, 18, or about 20 wt % or more.

The anode can include Mg or an Mg alloy. The anode can be substantially free of materials other than Mg or alloys thereof. The anode can be magnesium alloy AZ91 that is about 90 wt % Mg, about 9 wt % Al, and about 1 wt iii Zn. The anode can be about 50 wt % to about 100 wt % Mg or Mg alloy, about 90 wt % to about 100 wt % Mg or Mg alloy, or less than, equal to, or greater than about 50 wt %, 55, 60, 65, 70, 75, 80, 85, 90, 91, 92, 93, 94, 95, 96, 97, 9.8, 99, 99.5, 99.9, 99.99, or about 99.999 wt % Mg or Mg alloy or more.

The anode can include Al. The anode can be substantially free of materials other than Al. The anode can be about 50 wt % to about 100 wt % Al, about 90 wt % to about 100 wt % Al, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more.

The galvanic cell can include a conductive connector that electrically connects the anode and the cathode. The conductive connector has a different composition than the anode and the cathode. The conductive connection can be a solid material with a homogeneous composition or can be a coating on another material. The conductive connector can include Cu, Zn, Fe, Cd, Ni, Sn, Pb, or a combination thereof. The conductive connector can include Cu. The conductive connector can include Zn. The conductive connector can include an alloy including Cu and Zn. The conductive connector can include brass. The conductive connector can include brass and can be substantially free of other materials. The conductive connector can be about 50 wt % to about 100 wt % brass, about 90 wt % to about 100 wt %, or less than, equal to, or greater than about 50 wt %, 55, 60, 65, 70, 75, 80, 85, 90, 91, 92, 93, 94, 95, 96, 97, 98, or about 99, 99.5, 99.9, 99.99, or about 99.999 wt % or more.

The cathode can have a work function that is larger than the work function of the anode. For example, Cu has a work function of about 4.53-5.10 eV, Mg has a work function of about 3,66 eV, and Al has a work function of about 4.06-4.26 eV. The conductive connector can have a work function that is between the work function of the cathode and the work function of the cathode.

The aqueous composition can have any suitable conductivity during immersion of the galvanic cell in the aqueous composition, such as about 100 µS to about 1,000,000 µS, or about 3000 to about 100,000 µS, or about 100 µS to about 1,200 µS, or less than, equal to, or greater than about 100 µS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250,000, 500,000, 750,000, or about 1,000,000 µS or more. The method can be free of regulation of the conductivity of the aqueous composition. In some embodiments, the method can include regulating the conductivity of the aqueous composition such that the conductivity is maintained at about 100 µS to about 1,000,000 µS, or about 300 µS to about 100,000 µS, or about 100 µS. to about 1,200 or less than, equal to, or greater than about 100 µS, 200, 300, 400, 500, 600, 700, 800, 900, 1,000, 1,100, 1,200, 1,500, 2,000, 4,000, 6,000, 10,000, 15,000, 20,000, 50,000, 100,000, 150,000, 200,000, 250,000, 500,000, 750,000, or about 1,000,000 µS or more. Regulating the conductivity of the aqueous composition can include regulating a rate of introduction of fresh aqueous composition to the galvanic cell. Regulating the conductivity of the aqueous composition can include adding one or more salts to the aqueous composition. The salt can be added to the aqueous composition before immersing the galvanic cell in the aqueous composition, during the immersion of the galvanic cell in the aqueous composition, after the immersion of the galvanic cell in the aqueous composition, or a combination thereof. The one or more salts added to the aqueous composition to regulate the conductivity thereof can include halogen salts, sodium salts, potassium salts, or a combination thereof. The one or more salts added to the aqueous composition to regulate the conductivity thereof can include sodium chloride.

The galvanic cell can generate a current when immersed in the aqueous composition. The amount of current generated by the galvanic cell can be any suitable amount of current, such as about 0.001 mA/cm$^2$ to about 10 mA/cm$^2$, 0.01 mA/cm$^2$ to about 0.5 mA mA/cm$^2$, or less than, equal to, or greater than about 0.001 mA/cm$^2$, 0.005, 0.01, 0.015, 0.02, 0.025, 0.03, 0.035, 0.04, 0.045, 0.05, 0.06, 0.07, 0.08, 0.09, 0.1, 0.15, 0.2, 0.25, 0.3, 0.35, 0.4, 0.45, 0.5, 0.6, 0.7, 0.8, 0.9, 1, 1.2, 1.5, 2, 2.5, 3, 4, 5, 6, 7, 8, 9, or about 10 mA/cm$^2$ or more.

The method can be free of performing any steps to adjust pH of the treated aqueous composition. In some embodiments, the method can include adjusting the pH of the treated aqueous composition to be about 6 to 8, or about 7, or less than, equal to, or greater than about 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, or about 8 or more.

The method can include immersing one or more of the galvanic cells in an enclosure including the aqueous composition to form a solid that includes a material from the aqueous composition (e.g., a precipitate, salt, and/or coagulated particles). The method can include filtering the solid from the treated aqueous composition via one of more filters that are at least partially submerged in the aqueous composition that immerses the galvanic cells. The filter can include a glass frit, a fabric filter, a paper filter, a disk filter, a rotary filter, a drum filter, a screen, a sieve, particulate filtration media, a filter aid, or a combination thereof. The filter can be a rotating disk filter. The filtering can include forming a filter cake on the filter, the filter cake including the solid that includes the material from the aqueous composition. The filtering can include backwashing the filter to remove the filter cake from the filter and to form a backwash liquor that includes the removed filter cake. Any suitable water can be used to backwash the filter, such as a portion of the aqueous composition including the precipitate.

The one or more galvanic cells can be positioned in the aqueous composition at side portions of the enclosure, wherein the filter is positioned approximately in a central portion of the enclosure in the aqueous composition such that the filter is in-between the plurality of galvanic cells. The method can include using a plurality of filters. The plurality of filters can include a plurality of rotating disk filters.

The galvanic cell can include a conductive connector that electrically connects the anode and the cathode, the conductive connector including Cu, Zn, Fe, Cd, Ni, Sn, Pb, or a combination thereof. The conductive connector can include zinc. The conductive connector can be brass. Direct contact between the anode and cathode (e.g., Mg/Cu or Al/Cu) can create a metal film (e.g., a passivating film) at points of contact that increase electrical resistance and therefore decrease the amount of ions formed by the electrode at that location (e.g., Mg or Al ions). A metal with a fermi level that is between that of the anode and cathode can reduce or completely avoid this issue, thereby providing higher, more consistent, and longer lasting electrical current and ion production in the galvanic cell, and can provide more homogeneous and consistent dissolution of aluminum or magnesium used in the electrodes.

In some embodiments, the anode and the cathode directly contact one another and the galvanic cell is free of the conductive connector, such that the electrodes are in an "electroless" configuration. In an electroless configuration, the sacrificial anode material can be electrochemically plated or deposited on the non-sacrificial cathode material, eliminating a need for conductive connectors to electrically connect the anode and the cathode. One advantage of various embodiments of the electroless configuration is that less metallic copper can be used and the electric drop between the electrodes can decrease compared to the configuration including conductive connectors.

The galvanic cell can include one cathode, or a plurality of cathodes. The galvanic cell can include one anode, or a plurality of anodes. The galvanic cell can include no conductive connector, one conductive connector, or a plurality of conductive connectors. The galvanic cell can include a plurality of conductive connectors, wherein each conductive connector independently electrically connects the anode and cathode (e.g., in a parallel, rather than a series configuration). The plurality of conductive connectors can be approximately evenly distributed around a perimeter of the galvanic cell. The conductive connector can include a connector or fastener, such as a screw, a bold, a nut, a washer, or a combination thereof.

The galvanic cell can be of any suitable size or configuration such that the surface area of the galvanic cell(s) per unit volume of the aqueous composition is sufficient so that the one or more galvanic cells have the desired treatment effect on the aqueous composition during the residence time of the aqueous composition in the one or more galvanic cells. The galvanic cell can have any suitable total surface area per galvanic cell, or total anode surface area exposed to the aqueous composition per cell, such as about 1 cm$^2$ to about 1,000,000 cm$^2$, about 5 cm$^2$ to about 200,000 cm$^2$, about 10 cm$^2$ to about 50,000 cm$^2$, about 20 cm$^2$ to about 40,000 cm$^2$, or about 1 cm$^2$ or less, or less than, equal to, or greater than 2 cm$^2$, 4, 6, 8, 10, 15, 20, 25, 30, 35, 40, 45, 50, 75, 100, 150, 200, 250, 500, 750, 1,000, 1,500, 2,000, 2,500, 5,000, 7,500, 10,000, 15,000, 20,000, 25,000, 30,000, 35,000, 40,000, 45,000, 50,000, 75,000, 100,000, 150,000, 200,000, 500,000, 750,000, or about 1,000,000 cm$^2$ or more. The galvanic cell can have any suitable ratio of anode surface area to cathode surface area, such as a ratio of anode surface area exposed to the aqueous composition to cathode surface area exposed to the aqueous composition, such as about 0.001 to about 10, 0.01 to 1, 0.5 to 2, or less than, equal to, or greater than about 0.001, 0.005, 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.6, 2.8, 3, 3.5, 4, 4.5, 5, 5.5, 6, 7, 8, 9, or about 10 more. In some embodiments, the cell can be a Cu—Al cell with a larger Cu surface area than Al surface area. High surface area cathode materials can be used (e.g., for Cu cathode with Al anode), such as Cu nanoparticles, Cu sponge, Cu screen, porous or etched Cu, or a combination thereof. In sonic embodiments, the anode, the cathode, or a combination thereof, includes a roughened or etched surface for enhanced surface area. For the methods described herein, any suitable number of galvanic cells can be used, such as 1, 1 to 1,000,000, 1 to 1,000, 1 to 20, or less than, equal to, or greater than 2, 3, 4, 5, 6, 7, 8, 9, 10, 12, 14, 16, 18, 20, 25, 30, 35, 40, 45, 50, 60, 70, 80, 90, 100, 125, 150, 175, 200, 225, 250, 300, 400, 500, 750, 1,000, 1,250, 1,500, 1,750, 2,000, 2,500, 3,000, 4,000, 5,000, 10,000, 20,000, 50,000, 100,000, 250,000, 500,000, or about 1,000,000 or more. The cells can be used in series or parallel electrical arrangement.

The galvanic cell can include a spacing between a surface of the anode and a surface of the cathode (e.g., between the cathode and at least about 50% to 100% of the surface area of the anode, or about 80% to about 100%, or less than, equal to, or greater than about 50%, 55, 60, 65, 70, 75, 80, 85, 90, 95, 96, 97, 98, or about 99% or more) of about 1 mm to about 110 mm, or about 2 mm to about 30 mm, or less than, equal to, or greater than about 1 mm, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, 100, 105, or about 110 mm or more.

The galvanic cell can be planar in form, having a thickness that is less than a height and width. The galvanic cell can include a planar frame of the galvanic cell and a cathode material included within a perimeter of the frame, wherein the cathode material is electrically connected to the frame (e.g., via direct contact thereto). The frame can be a structural component of the galvanic cell. The frame can be structurally sufficient to maintain its shape in the absence of any of or all of the anodes. The planar frame and the cathode material included within the perimeter of the frame can both be the cathode.

The planar frame can be a nonporous solid material. The planar frame can be one or more strips of cathode material assembled to form the frame. The planar frame can have a polygonal perimeter, such as a square or rectangle. The cathode material included within the perimeter of the planar frame can include a porous cathode material, such as including wire, mesh, screen, a sheet including one or more through-holes, or a combination thereof. The porous cathode material can include a wire mesh or a wire screen including the porous cathode material. The porous cathode material included within the perimeter of the planar frame can have edges that are sandwiched between two of the planar frames, the two planar frames held together to secure the porous cathode material therebetween with one or more of the conductive connectors, such as via compression, via conductive connectors passing through one or more through-holes of the porous cathode material, or a combination thereof.

The galvanic cell can include a plurality of pairs of the planar frames e.g., 2 pairs to 20 pairs, or 2 pairs to 10 pairs, or less than, equal to, or greater than 2, 3, 4, 5, 6, 7, 8, 9, 10, 11, 12, 13, 14, 15, 16, 17, 18, 19, or 20 or more pairs), with each pair held together to secure the porous cathode material therebetween with one or more of the conductive connectors, and each pair separated by one or more of the anodes spanning across the porous cathode material included within the perimeter of the planar frame. The one or more anodes that separate each pair of planar frames from one another can directly contact a face of each pair of planar frames separated therewith. The one or more anodes that separate each pair of planar frames from one another can directly contact a face of one of each pair of planar frames separated therewith and can be free of direct contact with a face of the other of each pair of planar frames separated therewith.

The anode can be a strip fastened to the planar frame at two edges of the planar frame, wherein the anode is fastened to the planar frame with at least one of the conductive connectors at each of the two edges of the planar frame, such that the anode spans across the cathode material included within the perimeter of the planar frame forming a gap between the cathode material included within the perimeter of the planar frame and the anode strip. The anode and the cathode can directly contact one another at each of the edges of the planar frame where the anode is fastened to the planar frame via the at least one conductive connector.

The galvanic cell can include a plurality of the anodes, wherein each anode is a strip fastened to the planar frame at two edges of the planar frame on a face of the frame, wherein each of the anodes is fastened to the planar frame with at least one of the conductive connectors at each of the two edges of the planar frame, such that each of the anodes spans across the cathode material included within the perimeter of the planar frame forming a gap between the cathode material included within the perimeter of the planar frame and the anode strip, wherein the plurality of the anodes are spaced-apart across the face of the such that they do not physically contact one another. Each of the anodes can span across the cathode material included within the perimeter of the planar frame approximately parallel to one another on the face; anodes on another face of the planar frame can be parallel or perpendicular to the anodes on the first face. The two edges of the planar frame to which are fastened each anode can be opposite edges of the planar frame. The galvanic cell can have all of its anodes on a single major face of the planar frame, or some of the anodes can be on one major face of the planar frame and the other anodes are on another major face of the frame.

FIG. 1A illustrates a galvanic cell 110 viewed from a major face, according to various embodiments. The galvanic cell 110 includes the cathode, wherein the cathode includes a planar frame 120 of the galvanic cell having a polygonal perimeter and a porous material 130 included within the perimeter of the frame that is a wire mesh or a wire screen that is in direct contact with the frame. The galvanic cell 110 includes a plurality of the anodes 140, wherein each anode is a strip fastened to the planar frame at two opposite edges of the planar frame on a face of the planar frame. Each of the anodes is fastened to the planar frame with at least one of the conductive connectors 150 at each of the two edges of the planar frame, such that each of the anodes are approximately parallel to one another and span across the porous material included within the perimeter of the planar frame forming a gap (not shown) between the porous material included within the perimeter of the planar frame and the anode strip. Each anode directly contacts the cathode frame at each of the edges of the planar frame where the anode is fastened to the planar frame via the at least one conductive connector. Conductive connectors (not shown) can also be used that only pass through the planar frame 120 to secure the porous material 130 therebetween. The plurality of the anodes are spaced-apart across the face of the such that they do not physically contact one another, and wherein the gap (not shown) is about 1 mm to about 110 mm.

Figure 1B:
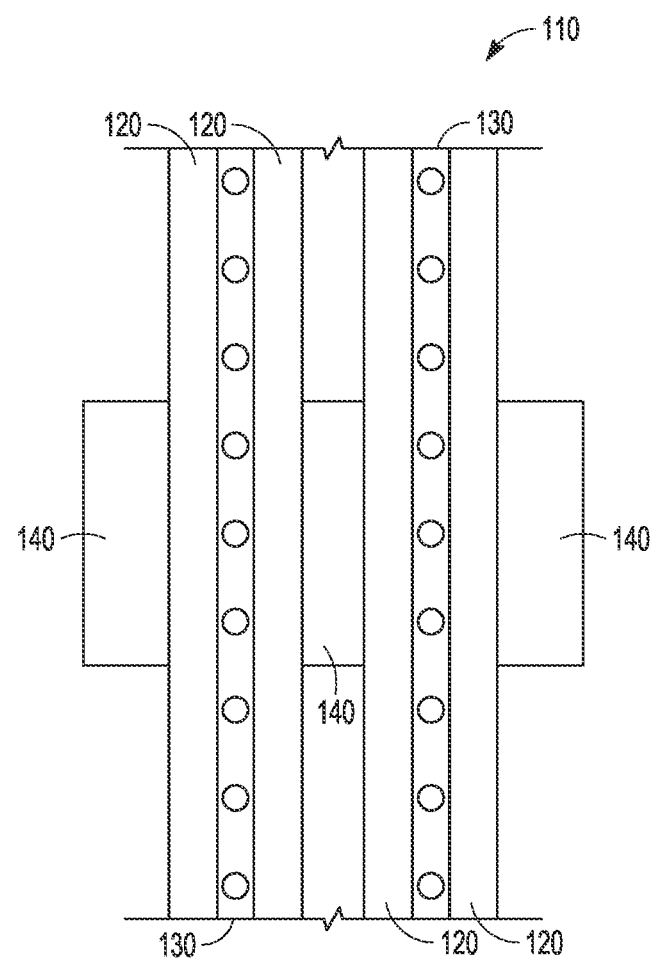
FIG. 1B illustrates a zoomed-in cutaway edge-view of a galvanic cell, according to various embodiments.

FIG. 1B illustrates a zoomed-in cutaway edge-view of galvanic cell 110, viewed along the perspective shown to the right of FIG. 1A. The galvanic cell can include a plurality of pairs of the planar frames 120, with each pair held together to secure the porous cathode material 130 therebetween with one or more of the conductive connectors (not shown). Anodes 140 spanning across the porous cathode material 130 included within the perimeter of the planar frame 120. Each pair of planar frames 120 is separated by anodes 140 (only one such anode is shown in FIG. 1B). The one or more anodes 140 that separate each pair of planar frames from one another directly contact a face of each pair of planar frames 120 separated therewith.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXAMPLES

Various embodiments of the present invention can be better understood by reference to the following Examples which are offered by way of illustration. The present invention is not limited to the Examples given herein.

The Examples of PCT/US2020/037405 and of PCT/US2020/037407 are hereby incorporated by reference in their entirety.

Unless otherwise indicated, for the small-sized cell used in these Examples, having copper cathodes and an aluminum anode, the finished size was 5 cm×20 cm with a thickness of about 4 mm and utilized copper meshes and an anode having a thickness of about 1 mm each. Aluminum anodes were 99.9 wt % pure aluminum (6061 aluminum alloy). The copper used in copper frames and copper mesh was 99.9 wt % pure copper. The small-sized cell included a single pair of copper meshes with an anode sandwiched therebetween, with the copper meshes and the anode separated from the copper meshes by 0.5 cm using electrically insulating plastic screws. The copper meshes were electrically connected to one another via a copper wire. The anode and the cathode were not electrically connected to one another (other than via multimeter and the surrounding water). The resulting surface area of sacrificial anode exposed to the water was about 400 mm$^2$ per cell.

Example 1

Effect of Relative Surface Area of Electrodes

Figure 2:
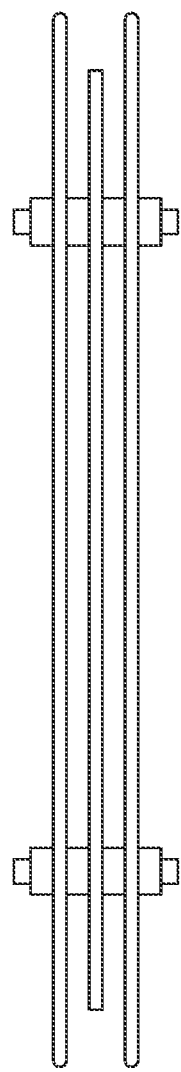
FIG. 2. illustrates a side-view photograph of a galvanic cell, in accordance with various embodiments.

Using the small-sized Al—Cu galvanic cell, laboratory experiments showed that an increase in the Al surface while keeping the surface of the Cu electrode constant did not produce appreciable changes in the electric current that circulated in the cell. However, the electric current in the cell increases when the surface of the Cu electrode is increased while maintaining the surface of the Al electrode constant. A side-view photograph of the cell used is shown in FIG. 2.

The results suggest that the reactions on the copper surface are the initiators of the overall chemical process that occurs in the cell (e.g., these reactions are the rate-limiting step of the overall process). This result is of great practical importance because designs with nanoparticles of Cu or Cu sponge electrodes, copper screening or other high surface area forms of copper could therefore increase the quantity of aluminum ions generated (or increase electric current) for the same potential difference (voltage) of the galvanic cell.

Figure 3A:
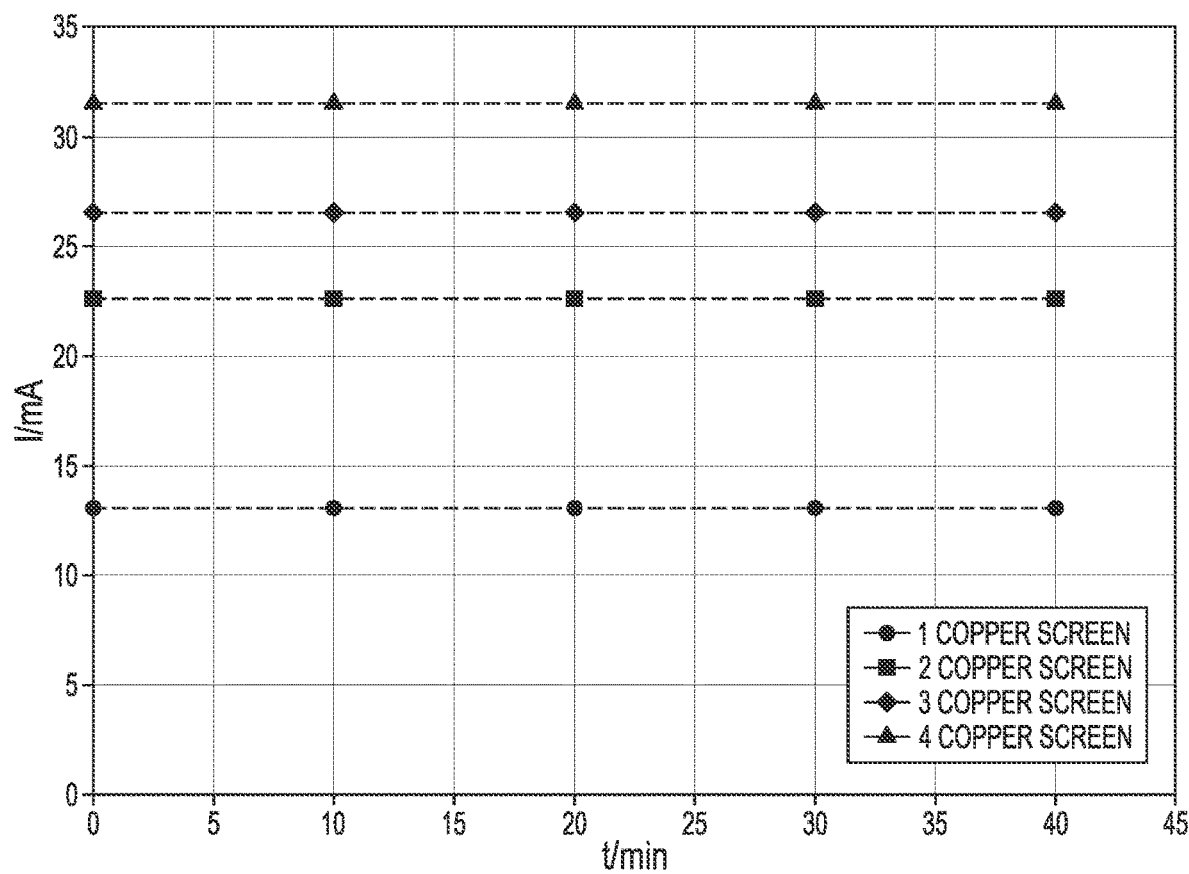
FIG. 3A illustrates a plot showing current versus time for four different Al—Cu galvanic cells: having a one-sided Cu screen, a two-sided Cu screen, a three-sided Cu screen, and a four-sided Cu screen, in accordance with various embodiments.
Figure 3B:
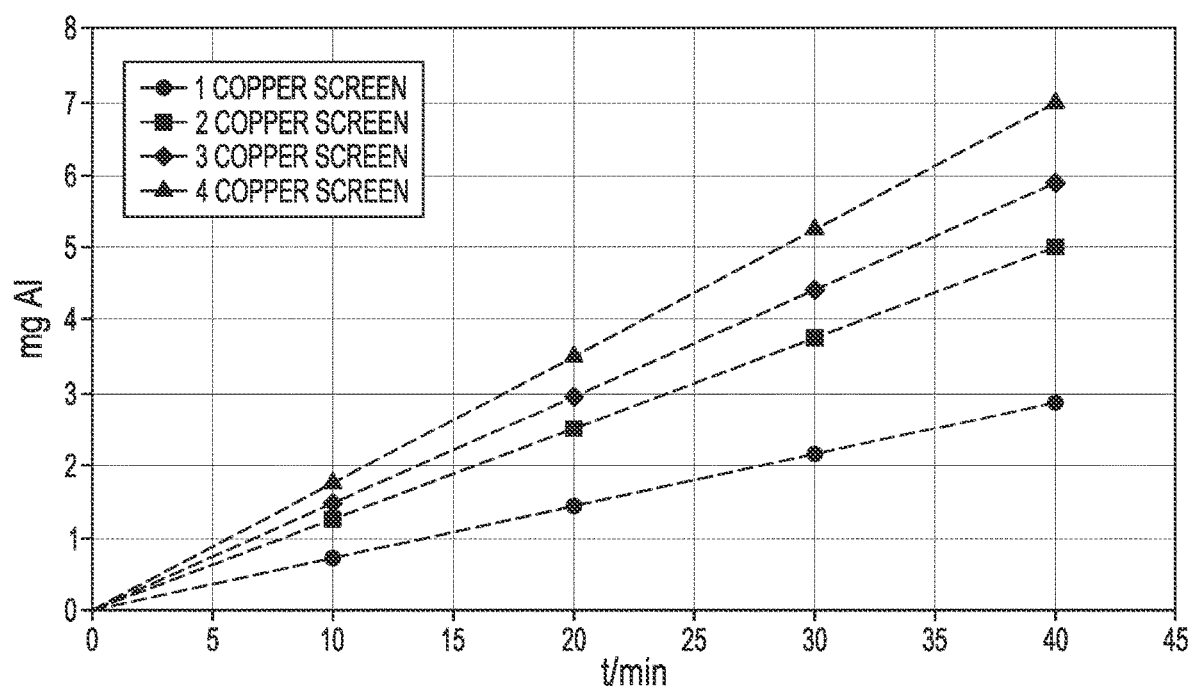
FIG. 3B shows the milligrams of aluminum ions that were generated versus time for four different Al—Cu galvanic cells, as calculated from the currents in the graph of FIG. 3A, in accordance with various embodiments.

FIG. 3A illustrates a plot showing current versus time for four different Al—Cu galvanic cells: having a one-sided Cu screen, a two-sided Cu screen, a three-sided Cu screen, and a four-sided Cu screen. FIG. 3B shows the milligrams of aluminum ions that were generated versus time, as calculated from the currents in the graph of FIG. 3A vs time. The results demonstrate that increasing the surface area of the Cu electrode increased the currents in the galvanic cell and therefore the amount of aluminum ions that were generated per time.

Example 2

Effect of Air Agitation

Figure 4:
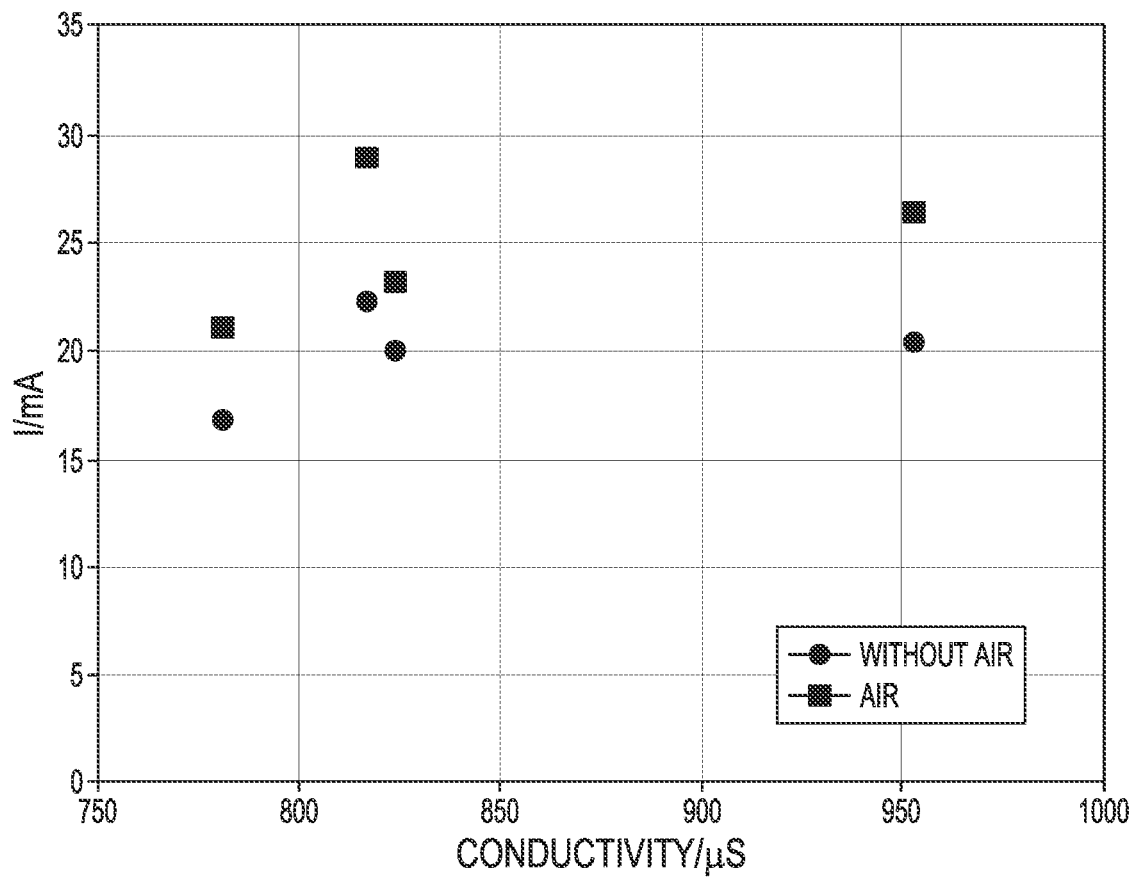
FIG. 4 shows a plot of the current versus the conductivity for an Al—Cu galvanic cell with and without air agitation, in accordance with various embodiments.

Laboratory and pilot scale (50 GPM) data on the small-sized Al—Cu galvanic cell showed that agitation with air causes depolarization of the cathodic electrode due to increased dissolved oxygen in the water. The reduction of molecular oxygen together the decomposition of the water at the cathode causes an increase of the electrical current by 20-30% and hence an increase in the amount of aluminum ions released from into solution. FIG. 4 shows a plot of the current versus the conductivity and illustrates that current increased at the same conductivity with the use of air agitation.

Example 3

Textile Industry

In the textile industry, the removal of colorants has been reported when Al and Fe electrodes have been used in electrolytic electrocoagulation systems. A galvanic cell produces the same effect with the advantage of the absence of external energy application, which significantly reduces the passivation processes, and operates with a much lower consumption of the anode (e.g., about 10 times lower consumption or more). Experiments carried out in our laboratory have verified that treatment with an Al—Cu galvanic cell has great effectiveness in the removal of molecules of dye, such as azo dyes, such as methyl orange and 2-napthol orange (i.e., Orange II or Acid Orange 7). In addition, subjecting water samples from textile treatment plants to galvanic treatment with the Al-Cu cell caused a decrease of chemical oxygen demand (COD) and a decrease in turbidity.

The azo dye compound Orange II is widely used in the textile industry. Various wastewater from the textile industry contains residual amounts of this compound in concentrations higher than permitted by environmental regulations. The following experimental work demonstrates the removal of Orange II dye from water utilizing a galvanic Al—Cu cell.

Figure 5:
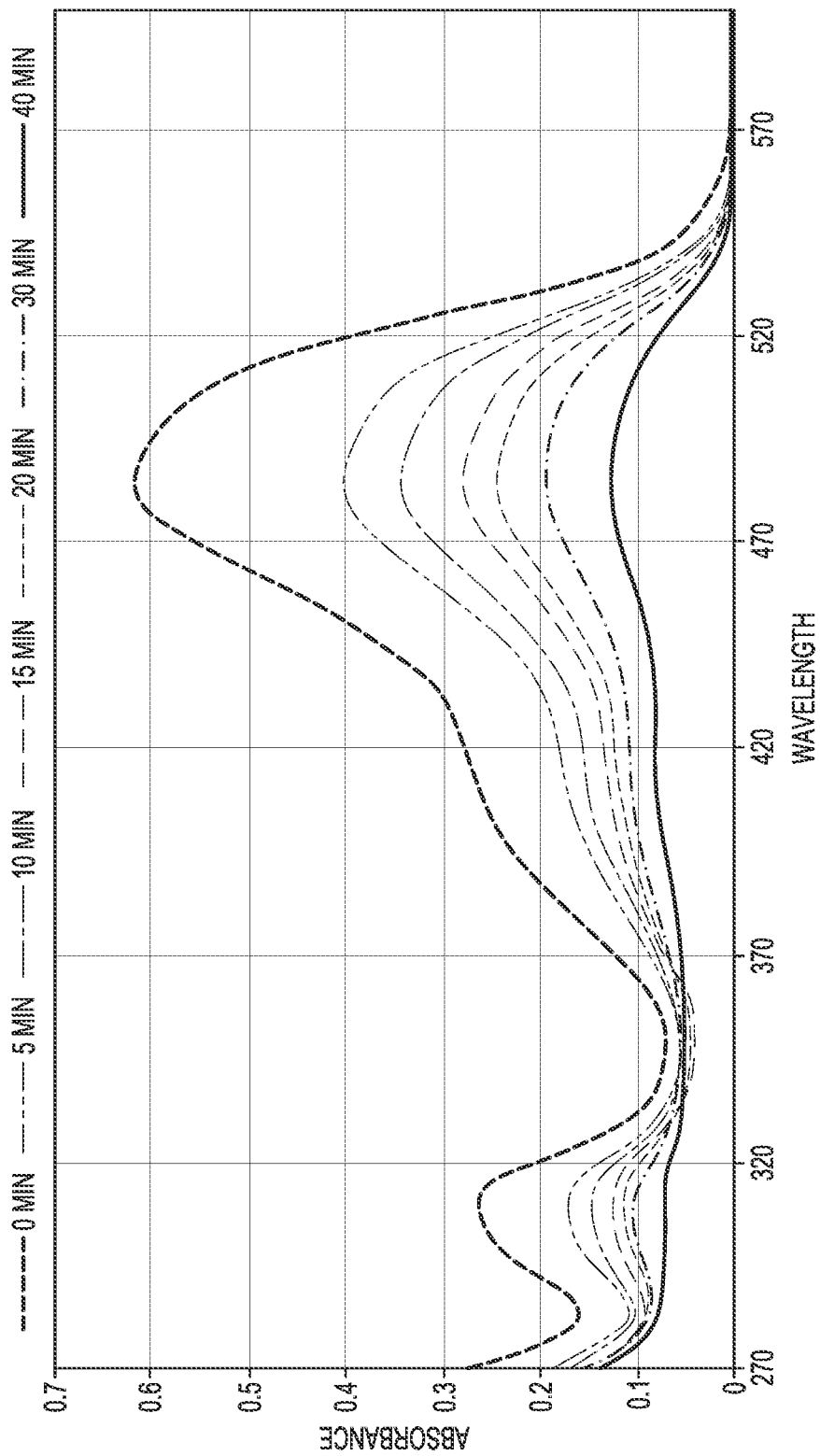
FIG. 5 illustrates an ultraviolet-visible spectrum at various times of a solution including Orange II in contact with a Cu—Al galvanic cell, in accordance with various embodiments.

A solution containing 12 ppm Orange II and 1 NaCl was prepared in the laboratory to demonstrate the removal efficiency of the Al—Cu galvanic cell. FIG. 5 illustrates the ultraviolet-visible (UV-VIS) spectra recorded as a function of time in this solution while in contact with a small-sized galvanic Al—Cu cell. The galvanic cell was not completely submerged in the solution that contained the dye. The surface of the aluminum plate is 160 $cm^2$, the aluminum surface area to volume of solution ratio was 0.162 $cm^2/cm^3$. The solution was filtered through a 0.45 μm filter before taking each spectrographic measurement.

Figure 6:
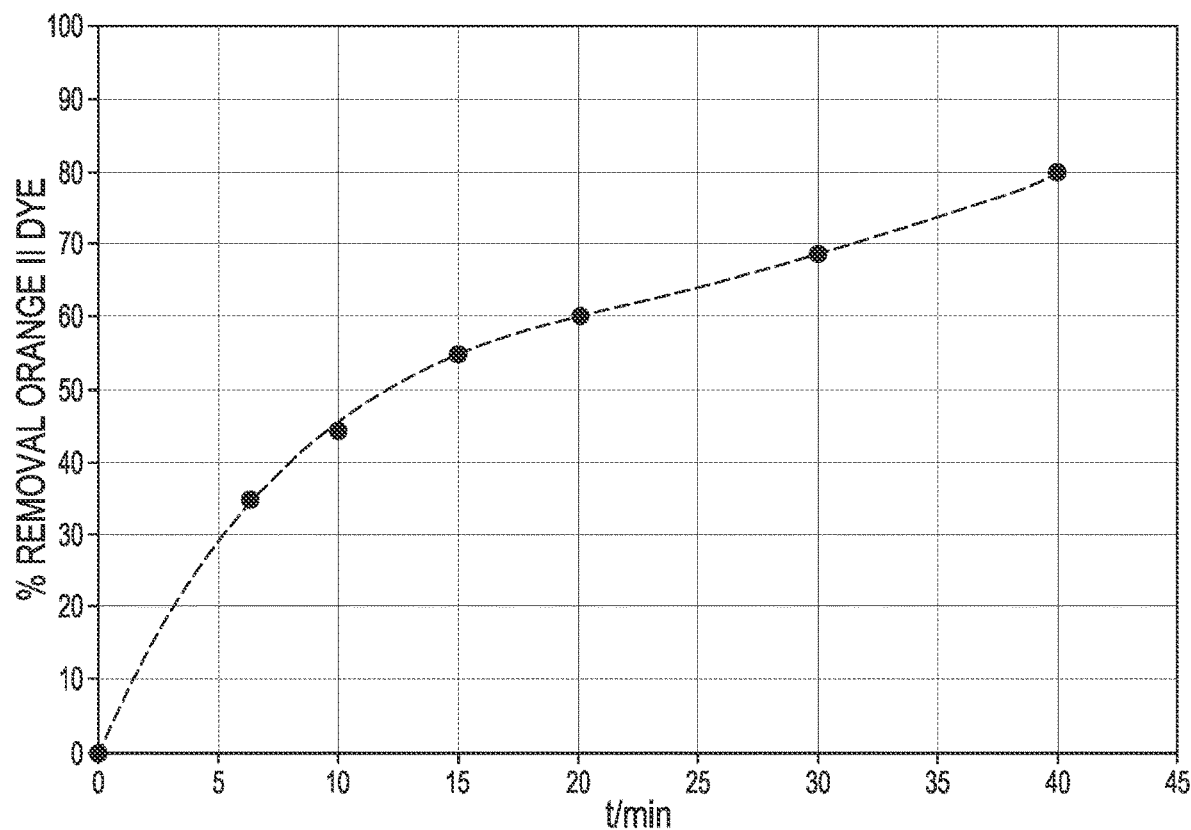
FIG. 6 illustrates percent removal versus time for removal of Orange II as using a Cu—Al cell as indicated by a 486 nm signal in the ultraviolet-visible spectrum, in accordance with various embodiments.

In FIG. 5, a decrease in absorbance is observed in the spectra recorded as a function of time due to the adsorption of the Orange II molecule on the newly hydrolyzed aluminum particles, products of the oxidation of the aluminum plate in the galvanic cell. FIG. 6 shows the percent Orange II removal (obtained from the signal at 486 nm in the ultraviolet-visible spectrum) as a function of time, which shows a first order relationship for the adsorption of Orange II dye on aluminum particles in suspension. The rate constant calculated from the graph is the apparent rate constant, because the removal kinetics of Orange 11 dye depends on the number of aluminum particles generated, which in turn depends on the aluminum surface area/volume of solution ratio and on the conductivity of the solution.

The galvanic process for the removal of soluble dyestuffs represents a significant advance over traditional removal processes for Orange II dye since the adsorption occurs on the hydrolyzed aluminum particle in suspension and not on the surface of the aluminum plate. This avoids the need for a clean-in-place process or removal and regeneration of adsorbent material as used in traditional processes. Based on the galvanic electric current measured, it was estimated that the amount of aluminum generated was between 5-6 ppm, enough to remove 80% of the initial Orange B dye concentration. This represents a low consumption of aluminum when compared to the coagulation produced for example by the chemical addition of aluminum salts or through the process of electrolytic electrocoagulation.

Example 4

Reduction of Chemical Oxygen Demand (COD)

Table 1 illustrates the effect on chemical oxygen demand of various aqueous compositions of treatment with a galvanic process. Air was bubbled through the composition during the galvanic treatment.

TABLE 1

Reduction of COD of various aqueous compositions.

| Aqueous Composition | Sample # | Influent COD (ppm) | Effluent COD (ppm) | % COD decrease | $Al^{3+}$ release (ppm) |
|---|---|---|---|---|---|
| Apopka Lake | 1 | 98 | 73 | 25.5 | 4.7 |
| | 2 | 105 | 82 | 21.9 | 5.1 |
| Okeechobee Lake | 1 | 98 | 75 | 23.5 | 4.9 |
| | 2 | 102 | 85 | 16.7 | 4.8 |
| | 3 | 95 | 76 | 20.0 | 5.2 |
| Synthetic Water | 1 | 595 | 103 | 82.7 | 4.5 |
| | 2 | 498 | 93 | 81.3 | 4.3 |
| Treatment Plant Effluent Water (flow condition = 20 GPM) | 1 | 67.9 | 59.3 | 12.7 | |
| | 2 | 64.4 | 60 | 6.8 | |
| | 3 | 62.7 | 53.4 | 14.8 | |
| | 4 | 117 | 101 | 13.7 | |
| | 5 | 153 | 111 | 27.5 | |
| | 6 | 62.3 | 50.2 | 19.4 | |
| | 7 | 71 | 51.1 | 28.0 | |

The small-sized Al/Cu cell was used for all aqueous compositions other than the treatment plant effluent water, which was treated with the following galvanic cell: the cells included copper cathodes and an aluminum anode, the finished size was 10 cm×160 cm with a thickness of about 6 mm and utilized copper meshes. Aluminum anodes were 6061 aluminum alloy. The copper mesh was 99.9% pure copper. The cell included a single pair of copper meshes with an anode sandwiched therebetween, with the copper meshes and the anode separated from the copper meshes by 0.5 cm using brass screws. A total of 192 cells were used. The resulting surface area of sacrificial anode exposed to the water was about 3200 cm² per cell.

Example 5

Removal of Silica From Water

Although silica in its different forms is not harmful to the life of animals and people, some industrial processes require its elimination. For example, the accumulation of scale of colloidal silica and dissolved in cooling and evaporation towers are a big problem due to silica fouling, which results in high maintenance costs, treatment water discharge, use of anti-fouling chemical additives, and downtime. in processes that use reverse osmosis, such as desalination or drinking water treatment processes, the incrustation of silica in reverse osmosis membranes entails expensive chemical treatments and a reduction in the time of use of the membrane. The galvanic cell represents an economical and efficient way to remove silica from water. Table 2 illustrates silica removal from a synthetic water using a galvanic process with the small-sized Al/Cu cell. The synthetic water was formed by adding 5 g NaCl and various amounts of $Na_2SiO_3$ to 1000 mL tap water. The synthetic water had a pH of 8-8.5.

TABLE 2

Silica removal from synthetic water.

| Sample # | Influent $SiO_3^{2-}$ (ppm) | Effluent $SiO_3^{2-}$ (ppm) | % $SiO_3^{2-}$ reduction | $Al^{3+}$ release (ppm) |
|---|---|---|---|---|
| 1 | 43 | 25 | 41.9 | 11.3 |
| 2 | 42 | 23 | 45.2 | 12.1 |
| 3 | 27 | 11 | 59.3 | 11.6 |
| 4 | 30 | 14 | 53.3 | 11.2 |
| 5 | 19 | 6 | 68.4 | 17 |
| 6 | 20 | 9 | 55.0 | 13 |

Example 6

Decrease in Turbidity of Oil/Water Emulsion

Table 3 illustrates decreasing turbidity of a synthetic oil/water emulsion using a galvanic process with the small-sized Al/Cu cell. The synthetic oil/water emulsion was formed by combining 1 mL of a. 1:1 wt:wt mixture of cutting oil and car engine oil with 1000 ml, tap water and adding 5 g NaCl. The resulting synthetic oil/water emulsion had a pH of 6.6. After using the galvanic process, the resulting water was filtered with a 1 micron cloth filter prior to turbidity testing. The units used for turbidity in Table 3 are nephelometric turbidity unit (NTU). Turbidity was measured using a single detector at 90 degrees to the incident beam.

TABLE 3

Decreasing turbidity of oil/water emulsion.

| Sample # | Influent turbidity | Effluent turbidity | % Turbidity reduction | $Al^{3+}$ release(ppm) |
|---|---|---|---|---|
| 1 | 224 | 1.4 | 99.4 | 3.35 |
| 2 | 344 | 1.60 | 99.5 | 2.50 |
| 3 | 119 | 1.81 | 98.5 | 3.20 |

Exemplary Embodiments

The following exemplary embodiments are provided, the numbering of which is not to be construed as designating levels of importance:

Embodiment 1 provides a method of treating an aqueous composition, the method comprising:
  immersing a galvanic cell in the aqueous composition to form a treated aqueous composition, the galvanic cell comprising
    an anode comprising Mg, Al, Fe, Zn, or a combination thereof, and
    a cathode having a different composition than the anode, the cathode comprising Cu, Ni, Fe, or a combination thereof.

Embodiment 2 provides the method of Embodiment 1, wherein the galvanic cell is operated as a galvanic cell.

Embodiment 3 provides the method of any one of Embodiments 1-2, comprising applying no external electrical potential across the anode and the cathode of the galvanic cell.

Embodiment 4 provides the method of any one of Embodiments 1-3, wherein an applied external electrical potential across the anode and the cathode is 0 V.

Embodiment 5 provides the method of any one of Embodiments 1-4, wherein an electrical potential between the anode and the cathode is equal to the galvanic corrosion potential of the galvanic cell.

Embodiment 6 provides the method of any one of Embodiments 1-5, wherein the method eliminates or reduces an emulsion in the aqueous composition, coagulates and/or precipitates suspended solids from the aqueous composition, removes or decreases the concentration of one or more organic compounds in the aqueous composition, removes or decreases the concentration of one or more inorganic compounds in the aqueous composition, removes or decreases the concentration of one or more dyes and/or inks in the aqueous composition, removes or decreases the concentration of one or more metals in the aqueous composition, removes or decreases the concentration of one or more heavy metals, removes or decreases the concentration of one or more toxic compounds and/or materials in the aqueous composition, removes or decreases the concentration of fluoride in the aqueous composition, removes or decreases the concentration of sulfide in the aqueous composition, removes or decreases the concentration of arsenic in the aqueous composition, reduces the chemical oxygen demand (COD) of the aqueous composition, reduces the turbidity of the aqueous composition, removes or decreases the concentration of silica in the aqueous composition (e.g., $SiO_3^{2-}$), or a combination thereof. For example, the method can reduce the concentration of $SiO_3^{2-}$ in the aqueous composition by 1% to 100%, or 20% to 90%, or 30% to 80%, or 40% to 70%, or less than or equal to 100% and greater than or equal to 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%.

Embodiment 7 provides the method of any one of Embodiments 1-6, wherein the aqueous composition comprises wastewater and/or effluent from: food processing, a landfill, a laundry process (e.g., detergent effluent), an industrial pulp or paper process, an industrial mining process, an industrial textile process, a metal-processing process, a metal-polishing process, a metalworking process, an industrial process in the tanning industry, a petroleum industrial process, marine wastewater, or a combination thereof.

Embodiment 8 provides the method of any one of Embodiments 1-7, wherein the aqueous composition comprises water taken from a source comprising a natural source of water in the environment, drinking water, industrial wastewater, industrial cooling water, or a combination thereof.

Embodiment 9 provides the method of any one of Embodiments 1-8, wherein the method eliminates or reduces an emulsion in the aqueous composition.

Embodiment 10 provides the method of Embodiment 9, wherein the aqueous composition comprises an oil/water, a water/oil emulsion, and/or a latex emulsion and wherein the treated aqueous composition comprises less oil/water, water/oil emulsion, and/or latex emulsion than the aqueous composition.

Embodiment 11 provides the method of any one of Embodiments 1-10, wherein the method coagulates and/or precipitates suspended solids from the aqueous composition.

Embodiment 12 provides the method of Embodiment 11, wherein the aqueous composition comprises suspended solid particles, wherein the treated aqueous composition has a lower concentration of the suspended solid particles than the aqueous composition.

Embodiment 13 provides the method of any one of Embodiments 11-12, further comprising removing coagulated materials and/or precipitates from the treated aqueous composition.

Embodiment 14 provides the method of Embodiment 13, wherein the removing comprises decantation, settling, filtration, or a combination thereof.

Embodiment 15 provides the method of any one of Embodiments 1-14, wherein the method removes or decreases the concentration of one or more organic compounds in the aqueous composition.

Embodiment 16 provides the method of Embodiment 15, wherein the treated aqueous composition has a lower concentration of the one or more organic compounds than the aqueous composition.

Embodiment 17 provides the method of any one of Embodiments 15-16, wherein the method chemically transforms the organic compounds, degrades the organic compounds, oxidizes the organic compounds, reduces the organic compounds, precipitates the organic compounds, coagulates the organic compounds, reacts the organic compounds with oxygen, reacts the organic compounds with chlorine, reacts the organic compounds with one or more ions generated at the anode and/or cathode, or a combination thereof.

Embodiment 18 provides the method of any one of Embodiments 1-17, wherein the method removes or decreases the concentration of one or more inorganic compounds in the aqueous composition.

Embodiment 19 provides the method of Embodiment 18, wherein the treated aqueous composition has a lower concentration of the one or more inorganic compounds than the aqueous composition.

Embodiment 20 provides the method of any one of Embodiments 18-19, wherein the method chemically transforms the inorganic compounds, degrades the inorganic compounds, oxidizes the inorganic compounds, reduces the inorganic compounds, precipitates the inorganic compounds, coagulates the inorganic compounds, reacts the inorganic compounds with oxygen, reacts the inorganic compounds with chlorine, reacts the inorganic compounds with one or more ions generated at the anode and/or cathode, or a combination thereof.

Embodiment 21 provides the method of any one of Embodiments 1-20, wherein the method removes or decreases the concentration of one or more dyes and/or inks in the aqueous composition.

Embodiment 22 provides the method of Embodiment 21, wherein the treated aqueous composition has a lower concentration of the one or more dyes and/or inks than the aqueous composition.

Embodiment 23 provides the method of any one of Embodiments 21-22, wherein the method chemically transforms the one or more dyes and/or inks, degrades the one or more dyes and/or inks, oxidizes the one or more dyes and/or inks, reduces the one or more dyes and/or inks, precipitates the one or more dyes and/or inks, coagulates the one or more dyes and/or inks, reacts the one or more dyes and/or inks with oxygen, reacts the one or more dyes and/or inks with chlorine, reacts the one or more dyes and/or inks with one or more ions generated at the anode and/or cathode, or a combination thereof.

Embodiment 24 provides the method of any one of Embodiments 1-23, wherein the method removes or decreases the concentration of one or more metals in the aqueous composition.

Embodiment 25 provides the method of Embodiment 24, wherein the treated aqueous composition has a lower concentration of the one or more metals than the aqueous composition.

Embodiment 26 provides the method of any one of Embodiments 24-25, wherein the method chemically transforms the one or more metals, degrades the one or more metals, oxidizes the one or more metals, reduces the one or more metals, precipitates the one or more metals, coagulates the one or more metals, reacts the one or more metals with oxygen, reacts the one or more metals with chlorine, reacts the one or more metals with one or more ions generated at the anode and/or cathode, or a combination thereof.

Embodiment 27 provides the method of any one of Embodiments 1-26, wherein the method removes or decreases the concentration of one or more heavy metals.

Embodiment 28 provides the method of Embodiment 27, wherein the treated aqueous composition has a lower concentration of the one or more heavy metals than the aqueous composition.

Embodiment 29 provides the method of any one of Embodiments 27-28, wherein the method chemically transforms the one or more heavy metals, degrades the one or more heavy metals, oxidizes the one or more heavy metals, reduces the one or more heavy metals, precipitates the one or more heavy metals, coagulates the one or more heavy metals, reacts the one or more heavy metals with oxygen, reacts the one or more heavy metals with chlorine, reacts the one or more heavy metals with one or more ions generated at the anode and/or cathode, or a combination thereof.

Embodiment 30 provides the method of any one of Embodiments 1-29, wherein the method removes or decreases the concentration of one or more toxic compounds and/or materials in the aqueous composition.

Embodiment 31 provides the method of Embodiment 30, wherein the treated aqueous composition has a lower concentration of the one or more toxic compounds and/or materials than the aqueous composition.

Embodiment 32 provides the method of any one of Embodiments 30-31, wherein the method chemically transforms the one or more toxic compounds and/or materials, degrades the one or more toxic compounds and/or materials, oxidizes the one or more toxic compounds and/or materials, reduces the one or more toxic compounds and/or materials, precipitates the one or more toxic compounds and/or materials, coagulates the one or more toxic compounds and/or materials, reacts the one or more toxic compounds and/or materials with oxygen, reacts the one or more toxic compounds and/or materials with chlorine, reacts the one or more toxic compounds and/or materials with one or more ions generated at the anode and/or cathode, or a combination thereof.

Embodiment 33 provides the method of any one of Embodiments 1-32, wherein the method removes or decreases the concentration of fluoride, sulfide, arsenic, or a combination thereof, in the aqueous composition.

Embodiment 34 provides the method of Embodiment 33, wherein the treated aqueous composition has a lower concentration of the fluoride, sulfide, arsenic, or a combination thereof, than the aqueous composition.

Embodiment 35 provides the method of any one of Embodiments 33-34, wherein the method chemically transforms the fluoride, sulfide, arsenic, or a combination thereof; degrades the fluoride, sulfide, arsenic, or a combination thereof; oxidizes the fluoride, sulfide, arsenic, or a combination thereof; reduces the fluoride, sulfide, arsenic, or a combination thereof; precipitates the fluoride, sulfide, arsenic, or a combination thereof; coagulates the fluoride, sulfide, arsenic, or a combination thereof; reacts the fluoride, sulfide, arsenic, or a combination thereof with oxygen; reacts the fluoride, sulfide, arsenic, or a combination thereof with chlorine; reacts the fluoride, sulfide, arsenic, or a combination thereof with one or more ions generated at the anode and/or cathode; or a combination thereof.

Embodiment 36 provides the method of any one of Embodiments 1-35, wherein the method reduces the chemical oxygen demand (COD) of the aqueous composition. For example, the method can reduce the COD of the aqueous composition by 1% to 100%, or 1% to 99%, or 3% to 95%, or 5% to 85%, or less than or equal to 100% and greater than or equal to 1%, 2, 3, 4, 5, 6, 8, 10, 12, 14, 16 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%.

Embodiment 37 provides the method of any one of Embodiments 1-36, wherein the method reduces the turbidity of the aqueous composition. For example, the method can reduce the turbidity of the aqueous composition (e.g., an oil/water or water/oil emulsion) by 1% to 100%, or 1% to 99.99%, or 80% to 99.999%, or 90% to 99.999%, or less than or equal to 100% and greater than or equal to 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or 99.99%.

Embodiment 38 provides the method of any one of Embodiments 1-37, wherein the immersing of the galvanic cell in the aqueous composition forms a salt comprising a material from the aqueous composition and a material from the anode.

Embodiment 39 provides the method of Embodiment 38, wherein the salt comprises a hydroxide salt.

Embodiment 40 provides the method of any one of Embodiments 38-39, further comprising removing the salt from the treated aqueous composition.

Embodiment 41 provides the method of any one of Embodiments 1-40, wherein the aqueous composition comprises a dissolved transition metal, post-transition metal, metalloid, or a combination thereof, further comprising forming a hydroxide salt comprising the transition metal, post-transition metal, or metalloid during the immersing of the galvanic cell in the aqueous composition.

Embodiment 42 provides the method of Embodiment 41, further comprising removing the salt from the treated aqueous composition.

Embodiment 43 provides the method of any one of Embodiments 41-42, wherein the transition metal, post-transition metal, or metalloid is Sc, Y, Ti Cr, Mn, Fe, Co, Ni, Cu, Zr, Nb, Mo, Tc, Ru, Rh, Pd, Ag, Hf, Ta, W, Re, Os, Ir, Pt, Au, Rf, Db, Sg, Bh, Hs, Al, Zn, Ga, Cd, in, Sn, Hg, Tl, Pb, Bi, Po, Cn, B, Si, Ge, As, Sb, Te, At, or a combination thereof.

Embodiment 44 provides the method of any one of Embodiments 41-43, wherein the transition metal, post-transition metal, or metalloid is Hg, Fe, Cr, Ni, Zn, Cd, As, or a combination thereof.

Embodiment 45 provides the method of any one of Embodiments 1-44, comprising forming $H_2$ and $HO^-$ at the anode during the immersing of the galvanic cell in the aqueous composition.

Embodiment 46 provides the method of any one of Embodiments 1-45, comprising forming $H_2$ and $HO^-$ at the cathode during the immersing of the galvanic cell in the aqueous composition.

Embodiment 47 provides the method of any one of Embodiments 1-46, comprising forming $H_2O_2$, $HO_2^-$, or a combination thereof at the cathode during the immersing of the galvanic cell in the aqueous composition.

Embodiment 48 provides the method of any one of Embodiments 1-47, further comprising adding acid, base, or a combination thereof to the aqueous composition to adjust the pH thereof.

Embodiment 49 provides the method of Embodiment 48, wherein the acid, base, or combination thereof is added to the aqueous composition before the immersing of the galvanic cell in the aqueous composition, during the immersing of the galvanic cell in the aqueous composition, after the immersing of the galvanic cell in the aqueous composition, or a combination thereof.

Embodiment 50 provides the method of any one of Embodiments 1-49, further comprising recirculating the aqueous composition to contact the aqueous composition with the galvanic cell multiple times.

Embodiment 51 provides the method of any one of Embodiments 1-50, wherein the immersing of the galvanic cell in the aqueous composition comprises partial immersion.

Embodiment 52 provides the method of any one of Embodiments 1-51, wherein the immersing of the galvanic cell in the aqueous composition comprises complete immersion.

Embodiment 53 provides the method of any one of Embodiments 1-52, comprising immersing a plurality of the galvanic cells in the aqueous composition.

Embodiment 54 provides the method of any one of Embodiments 1-53, wherein the cathode comprises Cu and the anode comprises Mg.

Embodiment 55 provides the method of any one of Embodiments 1-54, wherein the cathode comprises Cu and the anode comprises Al.

Embodiment 56 provides the method of any one of Embodiments 1-55, wherein the cathode comprises Cu.

Embodiment 57 provides the method of any one of Embodiments 1-56, wherein the cathode is substantially free of materials other than Cu.

Embodiment 58 provides the method of any one of Embodiments 1-57, wherein the cathode is about 50 wt % to about 100 wt % Cu.

Embodiment 59 provides the method of any one of Embodiments 1-58, wherein the cathode is about 90 wt % to about 100 wt % Cu.

Embodiment 60 provides the method of any one of Embodiments 1-59, wherein the cathode comprises a Cu alloy, a Fe alloy, or a combination thereof.

Embodiment 61 provides the method of any one of Embodiments 1-60, wherein the cathode comprises a Ni—Cu alloy, a Ni—Fe alloy, a Cu—Fe alloy, or a combination thereof.

Embodiment 62 provides the method of any one of Embodiments 1-61, wherein the anode comprises Al.

Embodiment 63 provides the method of any one of Embodiments 1-62, wherein the anode is substantially free of materials other than Al.

Embodiment 64 provides the method of any one of Embodiments 1-63, wherein the anode is about 50 wt % to about 100 wt % Al.

Embodiment 65 provides the method of any one of Embodiments 1-64, wherein the anode is about 90 wt % to about 100 wt % Al.

Embodiment 66 provides the method of any one of Embodiments 1-65, wherein the anode comprises an alloy comprising Mg and Al.

Embodiment 67 provides the method of any one of Embodiments 1-66, wherein Mg and Al are about 50 wt % to about 100 wt % of the anode.

Embodiment 68 provides the method of any one of Embodiments 1-67, wherein the anode is substantially free of materials other than Mg, Mg alloys, and Al.

Embodiment 69 provides the method of any one of Embodiments 1-68, wherein the anode further comprises Ag, Pt, Au, or a combination thereof.

Embodiment 70 provides the method of Embodiment 69, wherein the Ag, Pt, Au, or the combination thereof is about 0.0001 wt % to about 20 wt % of the anode.

Embodiment 71 provides the method of any one of Embodiments 69-70, wherein the Ag, Pt, Au, or the combination thereof is about 0.0001 wt % to about 5 wt % of the anode.

Embodiment 72 provides the method of any one of Embodiments 1-71, wherein the anode comprises Mg.

Embodiment 73 provides the method of any one of Embodiments 1-72, wherein the anode is substantially free of materials other than Mg or alloys thereof.

Embodiment 74 provides the method of any one of Embodiments 1-73, wherein the anode is about 50 wt % to about 100 wt % Mg or alloys thereof.

Embodiment 75 provides the method of any one of Embodiments 1-74, wherein the anode is about 90 wt % to about 100 wt % Mg or alloys thereof.

Embodiment 76 provides the method of any one of Embodiments 1-75, wherein the anode and the cathode of the galvanic cell directly contact one another.

Embodiment 77 provides the method of any one of Embodiments 1-76, wherein the cathode has a work function that is larger than a work function of the anode.

Embodiment 78 provides the method of any one of Embodiments 1-77, wherein the galvanic cell further comprises a conductive connector that electrically connects the anode and the cathode, the conductive connector comprising Cu, Zn, Fe, Cd, Ni, Sn, Pb, or a combination thereof.

Embodiment 79 provides the method of Embodiment 78, wherein the conductive connector has a work function that is between a work function of the anode and a work function of the cathode.

Embodiment 80 provides the method of any one of Embodiments 78-79 wherein the conductive connector comprises Cu.

Embodiment 81 provides the method of any one of Embodiments 78-80, wherein the conductive connector comprises Zn.

Embodiment 82 provides the method of any one of Embodiments 78-81, wherein the conductive connector comprises an alloy comprising Cu and Zn.

Embodiment 83 provides the method of any one of Embodiments 78-82, wherein the conductive connector comprises brass.

Embodiment 84 provides the method of any one of Embodiments 78-83, wherein the conductive connector comprises brass, wherein the conductive connector is substantially free of other materials.

Embodiment 85 provides the method of any one of Embodiments 78-84, wherein the galvanic cell comprises a plurality of the conductive connectors, each conductive connector independently electrically connecting the anode and cathode.

Embodiment 86 provides the method of Embodiment 85, wherein the plurality of conductive connectors are approximately evenly distributed around a perimeter of the galvanic cell.

Embodiment 87 provides the method of any one of Embodiments 78-86, wherein the conductive connector comprises a screw, a bolt, a nut, a washer, or a combination thereof.

Embodiment 88 provides the method of any one of Embodiments 78-87, wherein the conductive connector comprises a screw or a bolt.

Embodiment 89 provides the method of any one of Embodiments 1-88, wherein the galvanic cell comprises a plurality of the cathodes.

Embodiment 90 provides the method of any one of Embodiments 1-89, wherein the galvanic cell comprises a plurality of the anodes.

Embodiment 91 provides the method of any one of Embodiments 1-90, wherein a ratio of anode surface area to cathode surface area for the galvanic cell is about 0.001 to about 10.

Embodiment 92 provides the method of any one of Embodiments 1-91, wherein a ratio of anode surface area to cathode surface area for the galvanic cell is about 0.01 to about 1.

Embodiment 93 provides the method of any one of Embodiments 1-92, wherein the cathode comprises a roughened or etched surface.

Embodiment 94 provides the method of any one of Embodiments 1-93, wherein the conductivity of the aqueous composition during immersion of the galvanic cell in the aqueous composition is about 100 µS to about 1,000,000 µS.

Embodiment 95 provides the method of any one of Embodiments 1-94, wherein the conductivity of the aqueous composition during immersion of the galvanic cell in the aqueous composition is about 300 µS to about 100,000 µS.

Embodiment 96 provides the method of any one of Embodiments 1-95, further comprising regulating conductivity of the aqueous composition such that the conductivity is about 100 µS to about 1,200 µS.

Embodiment 97 provides the method of Embodiment 96, wherein regulating the conductivity of the aqueous composition comprises regulating a rate of introduction of fresh aqueous composition to the galvanic cell.

Embodiment 98 provides the method of any one of Embodiments 96-97, wherein regulating the conductivity of the aqueous composition comprises adding one or more salts to the aqueous composition.

Embodiment 99 provides the method of Embodiment 98, wherein the salt is added to the aqueous composition before immersing the galvanic cell in the aqueous composition, during the immersion of the galvanic cell in the aqueous composition, after the immersion of the galvanic cell in the aqueous composition, or a combination thereof.

Embodiment 100 provides the method of any one of Embodiments 98-99, wherein the one or more salts added to the aqueous composition to regulate the conductivity thereof comprise halogen salts, sodium salts, potassium salts, or a combination thereof.

Embodiment 101 provides the method of any one of Embodiments 98-100, wherein the one or more salts added to the aqueous composition to regulate the conductivity thereof comprise sodium chloride.

Embodiment 102 provides the method of any one of Embodiments 1-101, further comprising separating the treated aqueous composition from the galvanic cell.

Embodiment 103 provides the method of any one of Embodiments 1-102, wherein the anode is a sacrificial anode.

Embodiment 104 provides the method of any one of Embodiments 1-103, further comprising applying shear to the aqueous composition during the immersing of the galvanic cell in the aqueous composition.

Embodiment 105 provides the method of Embodiment 104, wherein applying shear to the aqueous composition comprises bubbling air through the aqueous composition.

Embodiment 106 provides the method of any one of Embodiments 104-105, wherein the shear is sufficient to dislodge at least some bubbles comprising $H_2$ from the surface of the anode, cathode, or a combination thereof.

Embodiment 107 provides the method of any one of Embodiments 104-106, wherein the shear is sufficient to at least partially prevent oxide formation at the surface of the anode and/or cathode.

Embodiment 108 provides the method of any one of Embodiments 104-107, wherein the shear is sufficient to at least partially prevent agglomeration of one or more materials on the surface of the anode and/or cathode.

Embodiment 109 provides the method of any one of Embodiments 1-108, wherein the galvanic cell is planar.

Embodiment 110 provides the method of any one of Embodiments 1-109, wherein the galvanic cell has a thickness that is less than a height and a width of the galvanic cell.

Embodiment 111 provides the method of any one of Embodiments 1-110, wherein the cathode comprises a planar frame of the galvanic cell and a cathode material comprised within a perimeter of the frame, wherein the cathode material is electrically connected to the frame.

Embodiment 112 provides the method of Embodiment 111, wherein the frame is a structural component of the galvanic cell, the frame comprising the cathode material, wherein the frame is structurally sufficient to maintain its shape in the absence of any of or all of the anodes.

Embodiment 113 provides the method of any one of Embodiments 111-112, wherein the planar frame is nonporous solid material.

Embodiment 114 provides the method of any one of Embodiments 111-113, wherein the planar frame is one or more strips of cathode material.

Embodiment 115 provides the method of any one of Embodiments 111-114, wherein the planar frame has a polygonal perimeter.

Embodiment 116 provides the method of any one of Embodiments 111-115, wherein the planar frame is a square or rectangle.

Embodiment 117 provides the method of any one of Embodiments 111-116, wherein the cathode material comprised within the perimeter of the planar frame comprises a porous cathode material.

Embodiment 118 provides the method of Embodiment 117, wherein the porous cathode material comprises wire, mesh, screen, a sheet comprising one or more through-holes, or a combination thereof.

Embodiment 119 provides the method of any one of Embodiments 117-118, wherein the porous cathode material comprises a wire mesh or a wire screen comprising the porous cathode material.

Embodiment 120 provides the method of any one of Embodiments 117-119, wherein the galvanic cell further comprises a conductive connector that electrically connects the anode and the cathode, the conductive connector comprising Cu, Zn, Fe, Cd, Ni, Sn, Pb, or a combination thereof, wherein the porous cathode material comprised within the perimeter of the planar frame has edges that are sandwiched between two of the planar frames, the two planar frames held together to secure the porous cathode material therebetween with one or more of the conductive connectors.

Embodiment 121 provides the method of any one of Embodiments 117-120, wherein the galvanic cell comprises a plurality of pairs of the planar frames, each pair held together to secure the porous cathode material therebetween with one or more of the conductive connectors, and each pair separated by one or more of the anodes spanning across the porous cathode material comprised within the perimeter of the planar frame.

Embodiment 122 provides the method of Embodiment 121, wherein the one or more anodes that separate each pair of planar frames from one another directly contact a face of each pair of planar frames separated therewith.

Embodiment 123 provides the method of any one of Embodiments 121-122, wherein the one or more anodes that separate each pair of planar frames from one another directly contact a face of one of each pair of planar frames separated therewith and are free of direct contact with a face of the other of each pair of planar frames separated therewith.

Embodiment 124 provides the method of any one of Embodiments 117-123, wherein the galvanic cell further comprises a conductive connector that electrically connects the anode and the cathode, the conductive connector comprising Cu, Zn, Fe, Cd, Ni, Sn, Pb, or a combination thereof, wherein the anode is a strip fastened to the planar frame at two edges of the planar frame, wherein the anode is fastened to the planar frame with at least one of the conductive connectors at each of the two edges of the planar frame, such that the anode spans across the cathode material comprised within the perimeter of the planar frame forming a gap between the cathode material comprised within the perimeter of the planar frame and the anode strip.

Embodiment 125 provides the method of Embodiment 124, wherein the anode and the cathode directly contact one another at each of the edges of the planar frame where the anode is fastened to the planar frame via the at least one conductive connector.

Embodiment 126 provides the method of any one of Embodiments 117-125, wherein the galvanic cell further comprises a conductive connector that electrically connects the anode and the cathode, the conductive connector comprising Cu, Zn, Fe, Cd, Ni, Sn, Pb, or a combination thereof, wherein the galvanic cell comprises a plurality of the anodes, wherein each anode is a strip fastened to the planar frame at two edges of the planar frame on a face of the frame, wherein each of the anodes is fastened to the planar frame with at least one of the conductive connectors at each of the two edges of the planar frame, such that each of the anodes spans across the cathode material comprised within the perimeter of the planar frame foaming a gap between the cathode material comprised within the perimeter of the planar frame and the anode strip, wherein the plurality of the anodes are spaced-apart across the face of the such that they do not physically contact one another.

Embodiment 127 provides the method of Embodiment 126, wherein each of the anodes spans across the cathode material comprised within the perimeter of the planar frame approximately parallel to one another on the face.

Embodiment 128 provides the method of any one of Embodiments 126-127, wherein the two edges of the planar frame to which are fastened each anode are opposite edges of the planar frame.

Embodiment 129 provides the method of any one of Embodiments 126-128, wherein all of the anodes are on a single major face of the planar frame.

Embodiment 130 provides the method of any one of Embodiments 126-129, wherein some of the anodes are on one major face of the planar frame, and the other anodes are on another major face of the frame.

Embodiment 131 provides the method of any one of Embodiments 126-130, wherein the galvanic cell comprises the cathode, wherein the cathode comprises a planar frame of the galvanic cell having a polygonal perimeter and a porous material comprised within the perimeter of the frame that is a wire mesh or a wire screen that is in direct contact with the frame; and a plurality of the anodes, wherein each anode is a strip fastened to the planar frame at two opposite edges of the planar frame on a face of the planar frame, wherein each of the anodes is fastened to the planar frame with at least one of the conductive connectors at each of the two edges of the planar frame, such that each of the anodes are approximately parallel to one another and span across the porous material comprised within the perimeter of the planar frame forming a gap between the porous material comprised within the perimeter of the planar frame and the anode strip, wherein each anode directly contacts the cathode frame at each of the edges of the planar frame where the anode is fastened to the planar frame via the at least one conductive connector, wherein the plurality of the anodes are spaced-apart across the face of the such that they do not physically contact one another, and wherein the gap is about 1 mm to about 110 mm.

Embodiment 132 provides the method of any one of Embodiments 1-131, comprising immersing one or more of the galvanic cells in an enclosure comprising the aqueous composition to form a solid that comprises a material from the aqueous composition;

filtering the solid from the treated aqueous composition via one of more filters that are at least partially submerged in the aqueous composition that immerses the one or more galvanic cells.

Embodiment 133 provides the method of Embodiment 132, wherein the filter comprises a glass frit, a fabric filter, a paper filter, a disk filter, a rotary filter, a drum filter, a screen, a sieve, particulate filtration media, a filter aid, or a combination thereof.

Embodiment 134 provides the method of any one of Embodiments 132-133, wherein the filter is a rotating disk filter.

Embodiment 135 provides the method of any one of Embodiments 132-134, wherein the filtering comprises forming a filter cake on the filter, the filter cake comprising the solid.

Embodiment 136 provides the method of Embodiment 135, further comprising backwashing the filter to remove the filter cake from the filter and to form a backwash liquor that comprises the removed filter cake.

Embodiment 137 provides the method of Embodiment 136, wherein a portion of the water comprising the solid is used to backwash the filter.

Embodiment 138 provides the method of any one of Embodiments 132-137, wherein the one or more galvanic cells are positioned in the aqueous composition at side portions of the enclosure, wherein the filter is positioned approximately in a central portion of the enclosure in the aqueous composition.

Embodiment 139 provides the method of any one of Embodiments 132-138, comprising filtering the solid from the aqueous composition using a plurality of the filters.

Embodiment 140 provides the method of any one of Embodiments 132-139, wherein the one or more filters comprise a plurality of rotating disk filters.

Embodiment 141 provides a method of treating an aqueous composition, the method comprising:

immersing a galvanic cell in the aqueous composition to form a treated aqueous composition, the galvanic cell comprising an anode comprising Al, wherein the anode is about 90 wt % to about 100 wt % Al, a cathode comprising Cu, wherein the cathode is about 90 wt % to about 100 wt % Cu, a conductive connector that electrically connects the anode and the cathode, the conductive connector comprising an alloy comprising Cu and Zn.

Embodiment 142 provides the method of Embodiment 141, wherein the immersing of the galvanic cell in the aqueous composition removes or reduces a concentration of a material in the aqueous composition, the material comprising one or more organic compounds, one or more inorganic compounds, one or more dyes and/or inks, one or more metals, one or more heavy metals, one or more toxic compounds and/or materials, fluoride, sulfide, arsenic, or a combination thereof, and wherein the immersing of the galvanic cell in the aqueous composition chemically transforms the material, degrades the material, oxidizes the material, reduces the material, precipitates the material, coagulates the material, reacts the material with oxygen, reacts the material with chlorine, reacts the material with one or more ions generated at the anode and/or cathode, or a combination thereof.

Embodiment 143 provides a method of coagulating and/or precipitating suspended solids from an aqueous composition, the method comprising:
immersing a galvanic cell in the aqueous composition to form a treated aqueous composition comprising coagulated and/or precipitated suspended solids from the aqueous composition, the galvanic cell comprising
an anode comprising Al, wherein the anode is about 90 wt % to about 100 wt % Al,
a cathode comprising Cu, wherein the cathode is about 90 wt % to about 100 wt % Cu,
a conductive connector that electrically connects the anode and the cathode, the conductive connector comprising an alloy comprising Cu and Zn; and
removing the coagulated and/or precipitated suspended solids from the treated aqueous composition.

Embodiment 144 provides a method of reducing or eliminating an emulsion from an aqueous composition, the method comprising:
immersing a galvanic cell in the aqueous composition comprising an oil/water and/or water/oil emulsion to reduce or eliminate the emulsion from the aqueous composition and to form a treated aqueous composition, the galvanic cell comprising
an anode comprising Al, wherein the anode is about 90 wt % to about 100 wt % Al,
a cathode comprising Cu, wherein the cathode is about 90 wt % to about 100 wt % Cu,
a conductive connector that electrically connects the anode and the cathode, the conductive connector comprising an alloy comprising Cu and Zn.

Embodiment 145 provides the method of Embodiment 144, wherein the method reduces the turbidity of the aqueous composition by 80% to 99.999%.

Embodiment 146 provides a method of reducing chemical oxygen demand of an aqueous composition, the method comprising:
immersing a galvanic cell in the aqueous composition to reduce or eliminate the chemical oxygen demand of the aqueous composition and to form a treated aqueous composition, the galvanic cell comprising
an anode comprising Al, wherein the anode is about 90 wt % to about 100 wt % Al,
a cathode comprising Cu, wherein the cathode is about 90 wt % to about 100 wt % Cu,
a conductive connector that electrically connects the anode and the cathode, the conductive connector comprising an alloy comprising Cu and Zn.

Embodiment 147 provides the method of Embodiment 146, wherein the method reduces the chemical oxygen demand of the aqueous composition by 3% to 95%.

Embodiment 148 provides a method of reducing or eliminating silica from an aqueous composition, the method comprising:
immersing a galvanic cell in the aqueous composition to reduce or eliminate silica in the aqueous composition and to form a treated aqueous composition, the galvanic cell comprising
an anode comprising Al, wherein the anode is about 90 wt % to about 100 wt % Al,
a cathode comprising Cu, wherein the cathode is about 90 wt % to about 100 wt % Cu,
a conductive connector that electrically connects the anode and the cathode, the conductive connector comprising an alloy comprising Cu and Zn.

Embodiment 149 provides the method of Embodiment 148, wherein the method decreases a concentration of $SiO_3^{2-}$ in the aqueous composition by 20% to 90%.

Embodiment 150 provides the method of any one or any combination of Embodiments 1449 optionally configured such that all elements or options recited are available to use or select from.

What is claimed is:

1. A galvanic cell for treating an aqueous composition, the galvanic cell comprising:
a planar anode comprising Al;
a first and second cathode having the anode therebetween, the first and second cathode having a different composition than the anode and comprising Cu, wherein the first and second cathode comprises a porous cathode material, wherein the galvanic cell is free of an external electrical potential applied across the anode and first cathode and across the anode and the second cathode;
an electrically insulating connector that physically connects the anode, the first cathode, and the second cathode and maintains a gap between the anode and the first cathode and between the anode and the second cathode, wherein the anode, the first cathode, and the second cathode are free of direct contact with one another; and
an electrically conductive connector that electrically connects the first and second cathode to one another.

2. The galvanic cell of claim 1, wherein the anode is planar and the cathode is planar, and wherein the anode is parallel to the cathode, wherein the connector maintains the anode and the cathode in a parallel configuration with respect to one another.

3. The galvanic cell of claim 1, wherein the electrically insulating connector comprises plastic.

4. The galvanic cell of claim 1, wherein the electrically insulating connector comprises a plastic screw.

5. The galvanic cell of claim 1, wherein the porous cathode material comprises wire, mesh, screen, a sheet comprising one or more through-holes, or a combination thereof.

6. The galvanic cell of claim 1, wherein the cathode comprises a wire mesh or a screen.

7. The galvanic cell of claim 1, wherein the anode is a strip or a plate.

8. The galvanic cell of claim 1, wherein the anode is about 90 wt % to about 100 wt %.

9. The galvanic cell of claim 1, wherein the cathode is about 90 wt % to about 100 wt % Cu.

10. The galvanic cell of claim 1, wherein immersing the galvanic cell in the aqueous composition eliminates or reduces an emulsion in the aqueous composition, coagulates and/or precipitates suspended solids from the aqueous composition, removes or decreases the concentration of one or more organic compounds in the aqueous composition, removes or decreases the concentration of one or more inorganic compounds in the aqueous composition, removes or decreases the concentration of one or more dyes and/or inks in the aqueous composition, removes or decreases the concentration of one or more metals in the aqueous composition, removes or decreases the concentration of one or more heavy metals, removes or decreases the concentration of one or more toxic compounds and/or materials in the aqueous composition, removes or decreases the concentration of fluoride in the aqueous composition, removes or decreases the concentration of sulfide in the aqueous composition, removes or decreases the concentration of arsenic in the aqueous composition, reduces the chemical oxygen demand (COD) of the aqueous composition, removes or decreases the concentration of silica in the aqueous composition, reduces the turbidity of the aqueous composition, or a combination thereof.

11. The galvanic cell of claim 1, wherein the anode is a strip or a plate.

12. The galvanic cell of claim 1, wherein the electrically conductive connector comprises a wire.

13. A water treatment system comprising:
  a galvanic cell for treating of an aqueous composition, the galvanic cell comprising:
    a planar anode comprising Al;
    a first and second cathode having the anode therebetween, the first and second cathode having a different composition than the anode and comprising Cu, wherein the first and second cathode comprises a porous cathode material, wherein the galvanic cell is free of an external electrical potential applied across the anode and first cathode and across the anode and the second cathode;
    an electrically insulating connector that physically connects the anode, the first cathode, and the second cathode and maintains a gap between the anode and the first cathode and between the anode and the second cathode, wherein the anode, the first cathode, and the second cathode are free of direct contact with one another; and
    an electrically conductive connector that electrically connects the first and second cathode to one another; and
  an enclosure that comprises the galvanic cell therein.

14. The water treatment system of claim 13, wherein the water treatment system comprises one or more filters for removal of a solid formed from immersion of the galvanic cell in the aqueous composition.

* * * * *

UNITED STATES PATENT AND TRADEMARK OFFICE
CERTIFICATE OF CORRECTION

PATENT NO. : 12,168,621 B2
APPLICATION NO. : 17/838361
DATED : December 17, 2024
INVENTOR(S) : Borras et al.

Page 1 of 3

It is certified that error appears in the above-identified patent and that said Letters Patent is hereby corrected as shown below:

On the Title Page

On page 3, in Column 2, Item (56) under "Other Publications", Line 42, delete "Applictions" and insert --Applications-- therefor On page 4, in Column 2, Item (56) under "Other Publications", Line 67, delete "choloride" and insert --chloride-- therefor In the Specification In Column 1, Line 38, after "thereof", insert --.--

In Column 2, Line 33, delete "Al," and insert --Al.-- therefor

In Column 3, Line 43, delete "1%." and insert --1%,-- therefor

In Column 4, Line 12, delete "96%." and insert --96%,-- therefor

In Column 4, Line 12, delete "99." and insert --99.5%-- therefor

In Column 4, Line 12, delete "99 99%," and insert --99.99%,-- therefor

In Column 4, Line 15, after "of", insert --,--

In Column 4, Line 19, after "less", insert --,--

In Column 5, Line 50, after "series)", insert --.--

Signed and Sealed this
Thirteenth Day of January, 2026

John A. Squires
*Director of the United States Patent and Trademark Office*

CERTIFICATE OF CORRECTION (continued)
U.S. Pat. No. 12,168,621 B2

In Column 5, Line 59, after "compounds", insert --in--

In Column 5, Line 62, delete "mechanism," and insert --mechanism.-- therefor

In Column 6, Line 46, after "mechanism", insert --.--

In Column 6, Line 62, delete "mote" and insert --more-- therefor

In Column 7, Lines 25-26, after "composition", insert --.--

In Column 7, Line 29, after "mechanism", insert --.--

In Column 7, Line 39, delete "chlorine," and insert --chlorine;-- therefor

In Column 7, Line 41, delete "cathode," and insert --cathode;-- therefor

In Column 7, Line 47, delete "COD." and insert --COD,-- therefor

In Column 8, Line 13, after "thereof", insert --.--

In Column 8, Line 19, delete "degraded." and insert --degraded-- therefor

In Column 8, Line 58, after "surface", insert --.--

In Column 8, Line 63, after "processes", insert --.--

In Column 9, Line 4, delete "at" and insert --of-- therefor

In Column 9, Line 16, after "methods", insert --.--

In Column 10, Line 9, delete "material" and insert --materials-- therefor

In Column 10, Line 14, delete "agitating." and insert --agitating,-- therefor

In Column 11, Line 9, delete "0,0001" and insert --0.0001-- therefor

In Column 11, Line 20, delete "wt iii" and insert --wt %-- therefor

In Column 11, Line 24, delete "9.8," and insert --98,-- therefor

In Column 11, Line 52, delete "3,66" and insert --3.66-- therefor

CERTIFICATE OF CORRECTION (continued)
U.S. Pat. No. 12,168,621 B2

In Column 11, Line 59, delete "3000" and insert --300 µS-- therefor

In Column 12, Line 3, delete "µS." and insert --µS-- therefor

In Column 12, Line 3, after "1,200", insert --µS,--

In Column 14, Line 5, delete "sonic" and insert --some-- therefor

In Column 14, Line 58, delete "e.g.," and insert --(e.g.,-- therefor

In Column 17, Line 61, delete "1" and insert --1 g/L-- therefor

In Column 18, Line 15, delete "11" and insert --II-- therefor

In Column 18, Line 29, delete "B" and insert --II-- therefor

In Column 19, Line 22, delete "in" and insert --In-- therefor

In Column 19, Line 59, delete "a." and insert --a-- therefor

In Column 19, Line 60, delete "1000 ml," and insert --1000 mL-- therefor

In Column 21, Line 61, delete "99,99%." and insert --99.99%.-- therefor

In Column 23, Line 48, delete "16" and insert --16,-- therefor

In Column 24, Line 17, delete "Ti" and insert --Ti, V,-- therefor

In Column 24, Line 19, delete "in," and insert --In,-- therefor

In Column 26, Line 14, after "78-79", insert --,--

In Column 29, Line 19, delete "foaming" and insert --forming-- therefor

In Column 32, Line 5, delete "1449" and insert --1-449-- therefor